US008762376B2

(12) United States Patent
Snell et al.

(10) Patent No.: US 8,762,376 B2
(45) Date of Patent: Jun. 24, 2014

(54) FINANCIAL-SERVICE STRUCTURED CONTENT MANAGER

(71) Applicant: nCino, LLC, Wilmington, NC (US)

(72) Inventors: Nathan Snell, Wilmington, NC (US); David Patrick, Atlanta, GA (US); Neil Underwood, Wilmington, NC (US)

(73) Assignee: NCINO, LLC, Wilmington, NC (US)

( * ) Notice: Subject to any disclaimer, the term of this patent is extended or adjusted under 35 U.S.C. 154(b) by 0 days.

(21) Appl. No.: 14/021,344

(22) Filed: Sep. 9, 2013

(65) Prior Publication Data

US 2014/0012846 A1 Jan. 9, 2014

Related U.S. Application Data

(63) Continuation of application No. 13/673,638, filed on Nov. 9, 2012, now Pat. No. 8,572,083.

(60) Provisional application No. 61/714,647, filed on Oct. 16, 2012, provisional application No. 61/652,970, filed on May 30, 2012, provisional application No. 61/652,977, filed on May 30, 2012.

(51) Int. Cl.
*G06F 17/30* (2006.01)

(52) U.S. Cl.
USPC .......... 707/736; 707/778; 707/783; 707/793; 705/35; 705/38

(58) Field of Classification Search
USPC ............ 707/736, 778, 783, 786, 793; 705/35, 705/38
See application file for complete search history.

(56) References Cited

U.S. PATENT DOCUMENTS

| | | | | |
|---|---|---|---|---|
| 6,029,149 A * | 2/2000 | Dykstra et al. | | 705/38 |
| 6,128,602 A * | 10/2000 | Northington et al. | | 705/35 |
| 7,472,089 B2 * | 12/2008 | Hu et al. | | 705/38 |
| 7,490,059 B2 * | 2/2009 | Albee et al. | | 705/35 |
| 7,712,023 B1 * | 5/2010 | Bryan | | 715/223 |
| 7,720,730 B2 * | 5/2010 | Wiryawan et al. | | 705/35 |
| 7,765,136 B2 * | 7/2010 | Northington et al. | | 705/35 |
| 7,962,517 B2 * | 6/2011 | Tritt et al. | | 707/784 |
| 7,966,253 B2 * | 6/2011 | Casper et al. | | 705/38 |
| 8,117,117 B2 * | 2/2012 | Hu et al. | | 705/38 |
| 8,126,920 B2 * | 2/2012 | Hu et al. | | 707/784 |
| 8,140,572 B1 * | 3/2012 | Ballard et al. | | 707/776 |
| 8,364,579 B2 * | 1/2013 | Hu et al. | | 705/38 |
| 8,510,332 B2 * | 8/2013 | Ballard et al. | | 707/776 |
| 2004/0034592 A1 * | 2/2004 | Hu et al. | | 705/38 |
| 2006/0265258 A1 * | 11/2006 | Powell et al. | | 705/7 |

(Continued)

*Primary Examiner* — Thanh-Ha Dang
(74) *Attorney, Agent, or Firm* — Kilpatrick Townsend & Stockton LLP

(57) ABSTRACT

A financial-service system that manages content objects includes a chronicles platform with a chronicle associated with a loan request. A content manager determines a set of content objects to be associated with the chronicle and generates a bucket for each content object of the set of content objects. Each bucket is associated with a name and is configured to receive an associated content object. The chronicle is populated with the generated buckets. An interface that detects a user action and that thereafter receives or generates a content object, which is detected by the content manager and associated with a bucket. The content manager causes the bucket to receive the content object and presents representations of the buckets to a user. Representations of one or more buckets that have received a content object differ from representations of one or more other buckets that have not received a content object.

20 Claims, 21 Drawing Sheets

(56) References Cited

U.S. PATENT DOCUMENTS

| | | | |
|---|---|---|---|
| 2007/0011083 A1* | 1/2007 | Bird et al. | 705/38 |
| 2007/0244805 A1* | 10/2007 | Wiryawan et al. | 705/38 |
| 2008/0097898 A1* | 4/2008 | Hibbert et al. | 705/38 |
| 2010/0186066 A1* | 7/2010 | Pollard | 726/3 |
| 2010/0287092 A1* | 11/2010 | Colman et al. | 705/38 |
| 2011/0270833 A1* | 11/2011 | von Kaenel et al. | 707/736 |
| 2013/0232539 A1* | 9/2013 | Polunin et al. | 726/1 |
| 2013/0297488 A1* | 11/2013 | Boyanov et al. | 705/38 |
| 2013/0339922 A1* | 12/2013 | Sproule | 717/103 |

* cited by examiner

| State | Name | Type | 1st Status | Owner | Priority | Date | Exception Date | Comment |
|---|---|---|---|---|---|---|---|---|
| | Business Credit Report | | In-File | Compliance | | | | (5/25/12 10:47 AM) demomaster@ncino.com: [In-File] |
| » | Consumer Credit Report | | In-File | Compliance | | | | (5/25/12 10:46 AM) demomaster@ncino.com: [In-File] |
| » | BTR - Port City Coffee - 2010 | Affiliate Financials | In-File | Compliance | | | | (5/25/12 10:45 AM) demomaster@ncino.com: [In-File] |
| » | BTR - Port City Coffee - 2011 | Financials | In-File | Closer | | | | (6/14/12 10:08 AM) demomaster@ncino.com: [In-File] |
| » | BTR - Port City Coffee - 2012 | Financials | In-File | Compliance | | | | (5/25/12 10:45 AM) demomaster@ncino.com: [In-File] |
| » | PFS - Rob Ambrose - 2010 | Financials | In-File | Compliance | | | | (5/25/12 10:20 AM) demomaster@ncino.com: [In-File] |
| » | PTR - <Last Name> - <2012> | Financials | In-File | Compliance | | | | (5/25/12 10:46 AM) demomaster@ncino.com: [In-File] |
| » | PTR - <Last Name> - <20xy> | Financials | In-File | Compliance | | | | (5/25/12 10:46 AM) demomaster@ncino.com: [In-File] |
| » | PTR - <Last Name> - <20xz> | Financials | In-File | Compliance | | N/A | | (5/25/12 10:46 AM) demomaster@ncino.com: [In-File] |
| » | Proposal | Underwriting | In-File | Closer | | | | (6/20/12 3:41 PM) demomaster@ncino.com: [In-File] |
| » | Credit Memo | Unused | In-File | Compliance | | | | (5/25/12 10:46 AM) demomaster@ncino.com: [In-File] |
| ⊗ | ACH Form with Voided Check | Borrower Detail | Exception | Closer | | | Jun 12, 2012 | (5/31/12 1:26 PM) demomaster@ncino.com: [Exception] |
| ⓘ | Authorization to Release Information | Borrower Detail | Open | Closer | | | | |
| ⓘ | Authorization to file UCCs | Borrower Detail | Open | Compliance | | | | |

Name: Business Credit Report     Size: 240 KB     Versions:

FIG. 5A

| State | Name | Type | 1st Status | Owner |
|---|---|---|---|---|
| ⓘ | BTR - <Entity> - <20xy> | Affiliate Financials | Open | Closer |
| ⓘ | BTR - <Entity> - <20xx> | Financials | Open | Compliance |
| ⓘ | BTR - <Entity> - <20xz> | Financials | Open | Loan Ops |
| ⓘ | PFS - <Last Name> - <MM-DD-YY> | Financials | Open | Construction |
| ⓘ | PTR - <Last Name> - <20xx> | Financials | Open | Attorney |
| ⓘ | PTR - <Last Name> - <20xy> | Financials | Open | Servicing |
| ⓘ | PTR - <Last Name> - <20xz> | Financials | Open | Special Assets |
| ⓘ | Change Memo & Approval | Underwriting | Open | |
| ⓘ | Consumer Credit Report | Underwriting | Open | |
| ⓘ | Credit Memo | Underwriting | Open | |
| ⓘ | Proposal | Underwriting | Open | |

Name: BTR - <Entity> - <20xy>

| State | Name | Type | 1st Status | Owner | Priority | Date | Exception Date |
|---|---|---|---|---|---|---|---|
| ⓘ | BTR - <Entity> - <20xy> | Affiliate Financials | Open | | | | |
| ⓘ | BTR - <Entity> - <20xx> | Financials | Open | | | | |
| ⓘ | BTR - <Entity> - <20xz> | Financials | Open | | | | |
| ⓘ | PFS - <Last Name> - <MM-DD-YY> | Financials | Open | | | | |
| ⓘ | PTR - <Last Name> - <20xy> | Financials | Open | | | | |
| ⓘ | PTR - <Last Name> - <20xz> | Financials | Open | | | | |
| ⓘ | Change Memo & Approval | Underwriting | Open | | | | |
| ⓘ | Consumer Credit Report | Underwriting | Open | | | | |
| ⓘ | Credit Memo | Underwriting | Open | | | | |
| ⓘ | Proposal | Underwriting | Open | | | | |

540

| August ▾ | | | | | | 2012 ◂ ▸ |
|---|---|---|---|---|---|---|
| Sun | Mon | Tue | Wed | Thu | Fri | Sat |
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 | |

Name: BTR - <Entity> - <20xx>    Size: 0

CHRONICLE #59384029

I. Applicant-Provided Information:

Name of Applicant: _Joe Smith_   Social Security Number: _555-55-5555_
Loan Number (Application Number if it didn't close): _1587409_
Date Received: _May 17, 2012_
Received by: Branch Number _4_   Officer Number: _3_   Employee Number: _17_
Loan Type: _Conventional_ (not FHA-insured, VA-guaranteed, or FSA/RHS)
Property Type: _1-4 family home_ (not manufactured or multi-family home)
Use of Proceeds:   _Home purchase_ (not home improvement or refinance)
Owner Occupancy: _Owner occupied, principal dwelling_
Pre-Approval (Home Purchase Only): _Pre-approval requested_
Loan Amount: _$450,000_          Property Purchase Price: _$615,000_
Ethnicity:      Applicant: _Hispanic_      Co-Applicant: N/A
Race: Applicant:                 Co-Applicant: N/A
Sex:   Applicant: _Male_          Co-Applicant: N/A
Gross Annual Income: _$120,000_
Property Location: _555 E 16th Street, Denver, CO 55555_
Requested Loan Term: _30 years_      Requested Loan Type: _Fixed Interest Rate_

II. Third-Party-Provided Information:

Credit Scores: 731, 683, 650
Appraised Property Value: $604,000
Other Outstanding Debt: $83,000

III. Internal Calculation Variables:

Potential Interest Rate: 4.5%
Potential Monthly Mortgage Payment: $2280   Debt-to-Income Ratio: 22.8%
Potential Monthly Total Debt Payment: $2870   Total Debt-to-Income Ratio: 28.7%
Down-Payment Percentage: 26.4%
Total Loan Score: 64
Suggested Action: Approve
Action taken: (1) ☐ Loan originated  (2) ☐ Approved, not accepted  (3) ☐ Denied
   (4) ☐ Withdrawn  (5) ☐ File closed for incompleteness  (6) ☐ Loan purchased
   by our institution  (7) ☐ Pre-approval request denied  (8) ☐ Pre-approval
   request approved but not accepted (optional reporting)
Date action taken:             If denied, reason:

FIG. 6

FINANCIAL-SERVICE STRUCTURED CONTENT MANAGER

CROSS-REFERENCES TO RELATED APPLICATIONS

This application is a continuation of application Ser. No. 13/673,638, filed on Nov. 9, 2012, which claims the benefit and priority of U.S. Provisional Application No. 61/714,647, filed on Oct. 16, 2012, U.S. Provisional Application No. 61/652,970, filed on May 30, 2012 and U.S. Provisional Application No. 61/652,977, filed on May 30, 2012. This application also claims the benefit and priority of U.S. Provisional Application No. 61/714,647, filed on Oct. 16, 2012. Each of these applications is hereby by reference in its entirety for all purposes.

BACKGROUND

A wide range of institutions are forced to comply with expectations, rules and standards that necessitate a high level of organization. For example, a bank is expected to reliably treat its customers and potential customers fairly. However, it is difficult to meet this objective. Each customer, account or other instance is surrounded by unique circumstances which can complicate efforts to consistently act fairly even in the most regimen of institutional efforts. A bank may find a particular customer characteristic to be extremely important in its decision with regard to that customer, but data on that characteristic may be unavailable for another customer. Additionally, within an institution, different people (e.g., employees) can be involved with different customers or accounts. This variation can lead to further inconsistency regarding implemented procedures and final results. Thus, regardless of whether an institution is attempting to apply consistent treatment to improve customer relations, to allow for internal operation reviews or to conform with external policies, the institution may struggle to implement this treatment consistency.

Further, even assessing whether consistent treatment was applied can be difficult. An institution can receive information from a range of sources. For example, different customers may be willing and/or able to provide different types of information, and different credit institutions may provide different data even in response to same requests. Employees receiving this data may further have different preferences in terms of what information to retain and how to organize the information. Thus, attempts to review histories associated with a series of, e.g., accounts can be difficult given the variation across the data associated with the accounts.

SUMMARY

In one embodiment, the present disclosure provides a method and system for standardizing stored content objects. For example, a content manager can prepopulate a storage area (e.g., associated with a loan request) to include a set of content buckets. Each content bucket can be associated with properties of an expected content object and can be associated with a name for the expected content object (e.g., "Credit Report 1"), an expected content-object type (e.g., pdf), file-size limits, task assignments to various users (e.g., Upload: User #78; Approve: Any Supervisor), and/or deadlines (e.g., Upload by Jun. 24, 2013; Approve by Jul. 1, 2013). Each content bucket can have a requirement identifier that indicates a required or desired status of the bucket (e.g., any status acceptable, filled, filled and approved, etc.).

An authorized user can then access a content object and use it to fill the content bucket. For example, an icon or description of a content file can be dragged and dropped into a representation of the content bucket. The content object can then automatically be renamed. Thus, all content objects including similar or same contents can be consistently named across storage areas. Additionally, users assigned tasks for the object (e.g., reviewing, editing or approving tasks) can be notified of the content object's presence.

For a given storage area, a user may be informed of statuses of the content buckets (e.g., empty, filled, or approved) in a bucket-specific or summarized manner (e.g., 90% of required content buckets filled). The user can thus be informed as to which content buckets have not yet reached their required or desired status. Therefore, the content manager can automatically indicate a standardized and informative view of a status of a storage area. Further, a user can view information across storage areas. As one example, the content manager can collect all documents stored within same-type buckets. As another example, the content manager can extract and statistically summarize data from documents stored within same-type buckets. Thus, the user can be provided with high- or low-level data associated with a set of storage areas (e.g., a set of accounts).

It will be appreciated that appropriate or desired characteristics such as content-object identities, status requirements and allowable user interactions with the content objects can vary across industries. Thus, e.g., it would be desirable to allow a financial institution and an academic institution to be able to interact with a system that maintains the uniformity within an institution's or industry's use of the system but nonetheless allows the system to be appropriately customized such that, e.g., the institutions are not required to upload same content objects. Embodiments of the invention therefore allow an authorized user to define, e.g., content buckets, possible content-bucket statuses, content-bucket characteristics (e.g., a required type or required file status), content-bucket priorities (e.g., requiring a first content bucket to be filled before a second content bucket), authorities allocated to other users, automated or possible aggregations across content buckets. The user can create or adjust these definitions using, e.g., a web-based or mobile-application-based interface. These definitions can thereafter be used to tailor a system which users in a particular institution or group of institutions can interact with.

In some embodiments, a financial-service system for managing content objects is provided. A chronicles platform includes a chronicle associated with a loan request. An interface detects a user action and that thereafter receives or generates a content object. A content manager determines a set of content objects to be associated with the chronicle and generates a bucket for each content object of the set of content objects. The bucket is associated with a name and is configured to receive an associated content object. The content manager further populates the chronicle with the generated buckets, detects the received or generated content object and associates the content object with a bucket of the generated buckets. The content manager also causes the bucket to receive the content object and presents representations of the buckets to a user. Representations of one or more buckets that have received a content object differ from representations of one or more other buckets that have not received a content object.

In some embodiments, a method for managing content objects is provided. A set of content objects to be associated with a chronicle is determined. A bucket for each content object of the set of content objects is generated. The bucket includes a name and is configured to receive an associated content object. The chronicle is populated with the generated buckets. A content object generated or received based on an interaction between a user and an interface is detected. The content object is associated with a bucket of the generated buckets. The bucket is caused to receive the content object. Representations of the buckets are presented. Representations of one or more buckets that have received a content object differ from representations of one or more other buckets that have not received a content object.

In some embodiments, a non-transitory computer-readable medium having sets of instructions stored thereon is provided. The instructions, when executed by a computer, cause the computer to determine a set of content objects to be associated with a chronicle and generate a bucket for each content object of the set of content objects. The bucket includes a name and is configured to receive an associated content object. The instructions, when executed by the computer, also cause the computer to populate the chronicle with the generated buckets, detect a content object generated or received based on interaction between a user and an interface and associate the content object with a bucket of the generated buckets. The instructions, when executed by the computer, further cause the computer to cause the bucket to receive the content object and present representations of the buckets. Representations of one or more buckets that have received a content object differ from representations of one or more other buckets that have not received a content object.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 5A-5D show examples of an interface presenting a content manager in operation;

FIG. 6 illustrates an embodiment of an overview of a chronicle;

Figure 1:
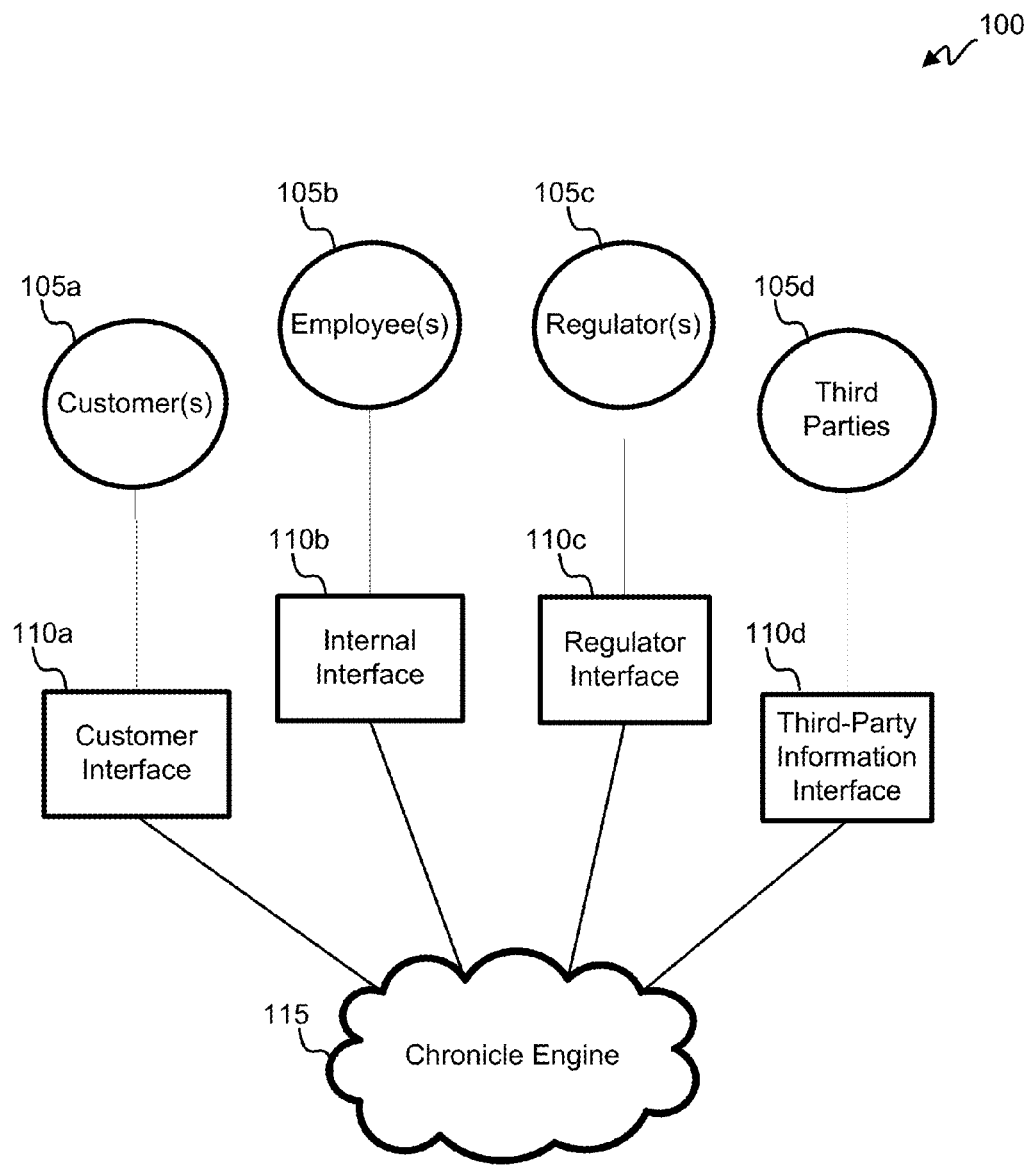
FIG. 1 depicts a block diagram of an embodiment of a service support system.

In the appended figures, similar components and/or features may have the same reference label. Further, various components of the same type may be distinguished by following the reference label by an alphabetical letter that distinguishes among the similar components. If only the first reference label is used in the specification, the description is applicable to any one of the similar components having the same first reference label irrespective of the alphabetical letter.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one embodiment, the present disclosure provides a method and system for standardizing stored content objects. For example, a content manager can prepopulate a storage area (e.g., associated with a loan request) to include a set of content buckets. Each content bucket can be associated with properties of an expected content object and can be associated with a name for the expected content object (e.g., "Credit Report 1"), an expected content-object type (e.g., pdf), file-size limits, task assignments to various users (e.g., Upload: User #78; Approve: Any Supervisor), and/or deadlines (e.g., Upload by Jun. 24, 2013; Approve by Jul. 1, 2013). Each content bucket can have a requirement identifier that indicates a required or desired status of the bucket (e.g., any status acceptable, filled, filled and approved, etc.). It will be appreciated that, as used herein, a content object can include an electronic An authorized user can then access a content object and use it to fill the content bucket. For example, an icon or description of a content file can be dragged and dropped into a representation of the content bucket. The content object can then automatically be renamed. Thus, all content objects including similar or same contents can be consistently named across storage areas. Additionally, users assigned tasks for the object (e.g., reviewing, editing or approving tasks) can be notified of the content object's presence.

For a given storage area, a user may be informed of statuses of the content buckets (e.g., empty, filled, or approved) in a bucket-specific or summarized manner (e.g., 90% of required content buckets filled). The user can thus be informed as to which content buckets have not yet reached their required or desired status. Therefore, the content manager can automatically indicate a standardized and informative view of a status of a storage area. Further, a user can view information across storage areas. As one example, the content manager can collect all content objects stored within same-type buckets. As another example, the content manager can extract and statistically summarize data from content objects stored within same-type buckets. Thus, the user can be provided with high- or low-level data associated with a set of storage areas (e.g., a set of accounts).

It will be appreciated that appropriate or desired characteristics such as content-object identities, status requirements and allowable user interactions with the content objects can vary across industries. Thus, e.g., it would be desirable to allow a financial institution and an academic institution to be able to interact with a system that maintains the uniformity within an institution's or industry's use of the system but nonetheless allows the system to be appropriately customized such that, e.g., the institutions are not required to upload same content objects. Embodiments of the invention therefore allow an authorized user to define, e.g., content buckets, possible content-bucket statuses, content-bucket characteristics (e.g., a required type or required file status), content-bucket priorities (e.g., requiring a first content bucket to be filled before a second content bucket), authorities allocated to other users, automated or possible aggregations across content buckets. The user can create or adjust these definitions using, e.g., a web-based or mobile-application-based interface. These definitions can thereafter be used to tailor a system which users in a particular institution or group of institutions can interact with.

The content manager can be used in various industries or contexts (e.g., a financial-service industry, a governmental context, a telecommunication industry, a retail industry, an education context, a health-care context, an energy or utilities industry, a hospitality or entertainment industry, a professional-service industry, a media industry, a product-development industry (e.g., consistently collecting documents and/or data for each potential product), a clinical-trials industry (e.g., consistently collecting documents and/or data for each clinical trial, product or patient), a journalism industry (e.g., consistently collecting documents and/or data for each topic), an investigation industry (e.g., consistently collecting documents and/or data for each investigation), or a real-estate industry (e.g., consistently collecting documents and/or data for each property, seller or potential buyer)) such that institutions (e.g., banks, government agencies, telecommunication-service operating entities, retail stores or chains, universities, schools, hospitals, physicians' office, energy-service-operating entities, hotels or hotel chains, law firms, architecture firms, or television networks) can reliably gather, organize and summarize data.

Referring first to FIG. 1, a block diagram of an embodiment of a service support system 100 is shown. Using service support system 100, a variety of agents 105 can initiate system actions, such as evaluating whether a financial service (e.g., a loan) will be provided, collecting and summarizing account-specific or inter-account financial-service information, or changing an account balance (e.g., via a payment, withdrawal or deposit).

An agent 105 may be provided with different types of interaction capabilities depending on their identity and means of accessing the service support system 100. Different types of agents 105 can access a chronicle engine 115 using different types of interfaces 110. Each interface 110 can include a security system to ensure that control or information is only provided to select types of agents or specific individuals.

One, more or all interfaces 110 can be coupled to chronicle engine 115 via a network, such as the Internet and may be available to a respective agent online. As described in further detail below, the chronicle engine 115 can generate and maintain a chronicles platform that includes a set of chronicles.

Each chronicle can include information pertaining to a request (e.g., a loan request, an admission request or an approval request), an account (e.g., a loan account, a student account, a purchase account), service, product or an interaction (e.g., a previous or pending transaction) associated with an institution. Thus, each chronicle can be associated with an entity (e.g., a person or company) associated with the request, the account, the service, the product and/or the interaction and can include pertinent information (e.g., a loan balance, a requested service or funding amount, a transaction amount, or dates of service) and entity-specific information (e.g., a requestor's current employment or ethnicity). In some instances, a chronicle can be associated with a single request, account, service, product or interaction. In some instances, a chronicle can be associated with an aspect of a request, account, service, product or interaction (e.g., an entity making a request, a requested product or service, collateral or a reference). In some instances, a chronicle can be associated with multiple requests, accounts, services, products or interactions (e.g., a chronicle tied to an entity can relate to multiple requests, accounts, services, products or interactions). Chronicle engine 115 can include a content manager to manage the chronicles.

A customer agent 105a can access the chronicle engine 115 via a customer interface 110A. Examples of the banking customer interface 110a can include, e.g., an online interface (e.g., an online banking interface or a request interface), a mobile-app interface or a kiosk interface (e.g., an automated transaction machine). Through the customer interface 110a, a customer agent 105a may be able to, e.g.: submit a request (e.g., a loan request, an admission request, a purchase request, a service-initiation request, a complaint), add or view data pertaining to an account, service, product or transaction (e.g., a balance due, a payment due date, a transaction data, a service usage, a status or demographic information pertaining to a user) and/or perform an action pertaining to an account, service, product or transaction (e.g., initiating a fund transfer, initiating a withdrawal or initiating a return). For example, a user can enter personal information by completing one or more fields in an interface-presented form or uploading one or more pieces of contents (e.g., scanned documents or electronic files).

An employee agent 105b can include an agent internal to an institution (e.g., a bank, government agency, company, chain or store, hospital, office, school or university). For example, the employee agent 105b can include a teller, a Board member, or an officer at a bank; an administrator or professor at a university; an administrator or director at a government agency; a salesperson or supervisor at a retail store; or an administrator or doctor at a hospital. The employee agent 105b can further include an agent hired by the financial-service institution (e.g., to maintain records). The employee agent 105b can access the chronicle engine 115 using an internal interface 110b. The internal interface 110b can include an intranet, cash register or secure online interface. Through the banking interface 110b, an employee agent 105b may be able to, e.g., enter information (e.g., identifying a requestor, what is requested or demographic information of a requestor); view, edit or request data (e.g., which may including viewing, editing or requesting documents); tangibly comment on data (e.g., data within a content object or a content object itself); view inter-chronicle summaries (e.g., identifying an overall loan approval rate); view requests associated with potentially concerning responses; verify an action (e.g., verifying reading of a disclaimer) or authorize one or more actions (e.g., account progression, request approvals, or freezing of a chronicle). Thus, the employee agent 105b can view and/or control information pertaining to a request, account, service, product or interaction tied to entities other than the agent.

A regulator agent 105c can include an agent external to an institution that has legal authority over the institution. The regulator agent 105c can include, e.g., a government employee, such as a Federal Deposit Insurance Corporation (FDIC) employee or an auditor. The regulator agent 105c can access the chronicle engine 115 using a regulator interface 110c. Through the regulator interface 110c, a regulator agent 105c may be able to view high-level and/or low-level information pertaining to, e.g., requests received by a institution, products or services provided by the institution, and/or status (e.g., financial status) of the institution. For example, a regulator agent 105c may be able to identify an overall loan approval rate and further identify ethnicity-specific loan approval rates for requestors of various ethnicities when the loan requests have a potential debt-to-income ratio within a particular range. As another example, a regulator agent 105c may be able to identify an overall acceptance rate amongst applicants applying to an undergraduate university and further identify ethnicity-specific acceptance rates for each of a set of ethnicities, controlling for standardized test scores and grade point averages.

The regulator agent 105c may further have access to various levels of information. For example, a highest level can provide summary information across all, e.g., requests or services. A second highest level can provide more specific summaries (e.g., aggregating the requests received or services or products provided based on a time range, a requestor's qualifications, a requestor's demographic characteristic, etc.). A lowest level of can provide specific information about a single request, account, service, product or interaction (e.g., identifying specific demographic and qualification information about a requestor, actions taken on the part of an institution, and payment history).

The regulator interface 110c may provide the regulator agent 105c with various data manipulation capabilities (e.g., to allow the regulator agent 105 to identify aggregation techniques or choose a level for data presentation). Meanwhile, the controls available to a regulator agent 105c via the regulator interface 110c may differ and/or may be more limited than controls available to an employee agent 105b via the internal interface 110b. For example, a regulator agent 105c may be allowed to shut down or suspend part of the chronicle engine 115 but may be otherwise unable to control its operation. This may be appropriate because regulators may be tasked with overseeing, but not operating, an institution. In some instances, all information and/or capabilities available to regulator agents 105c via the regulator interface 110c is further available to at least some employee agents 105b via the internal interface 110b. This may be appropriate because it may be advantageous for employee agents 105b to view and be allowed to react to potentially concerning information prior to review of the information by regulator agents 105c. In some instances, the regulator interface and the internal interface 110b may allow a regulator agent 105c to communicate with an employee agent 105b. For example, a regulator agent 105c can identify concerning or regulation-violating chronicles or data to the employee agent 105b.

A third-party agent 105d can include a non-regulator agent external to an institution that is provided with limited access to data associated with the institution. For example, a third-party agent 105d can include an agent that a customer agent 105a has indicated can view some or all data or an associated service, request or account. As another example, a third-party agent 105d can include an agent that a customer agent 105a or employee agent 105b has indicated can contribute to data of an associated request, account, service, product or interaction (e.g., by uploading a document or completing form fields).

The third-party agent 105d can include an employee at a credit bureau, an appraisal entity, a testing institution, an insurance company, a partnering company (e.g., a rental-car company partnering with a hotel company), or a public-relations company. The third-party agent 105d can access the chronicle engine 115 using a third-party information interface 110d. Through the third-party information interface 105d, a third-party agent 105d may be able to view or enter information pertaining to, e.g., a particular request, account, service, product or interaction. In some instances, the third-party agent 105d may be able to identify an entity (e.g., by inputting a person's social-security number), and data from all chronicles associated with the entity can be presented to the third-party agent 105d. Thus, for example, the third-party agent 105d may be able to view all assets and loans associated with a person at a financial institution. As another example, the third-party agent 105d may be able to view all transactions, returns and complaints associated with a product sold by a retail institution. In some instances, the third-party agent 105d may be able to identify an entity (e.g., by inputting a person's social-security number), and the third-party agent 105d can then view which data (e.g., specific fields or content objects) is requested from the third-party agent 105d with respect to that entity (the request can be tied specifically to the third-party agent 105d or can indicate that the data is requested from any entity meeting specific criteria that the third-party agent 105d meets), and the third-party agent 105d can then enter some or all of the requested data.

Figure 2:
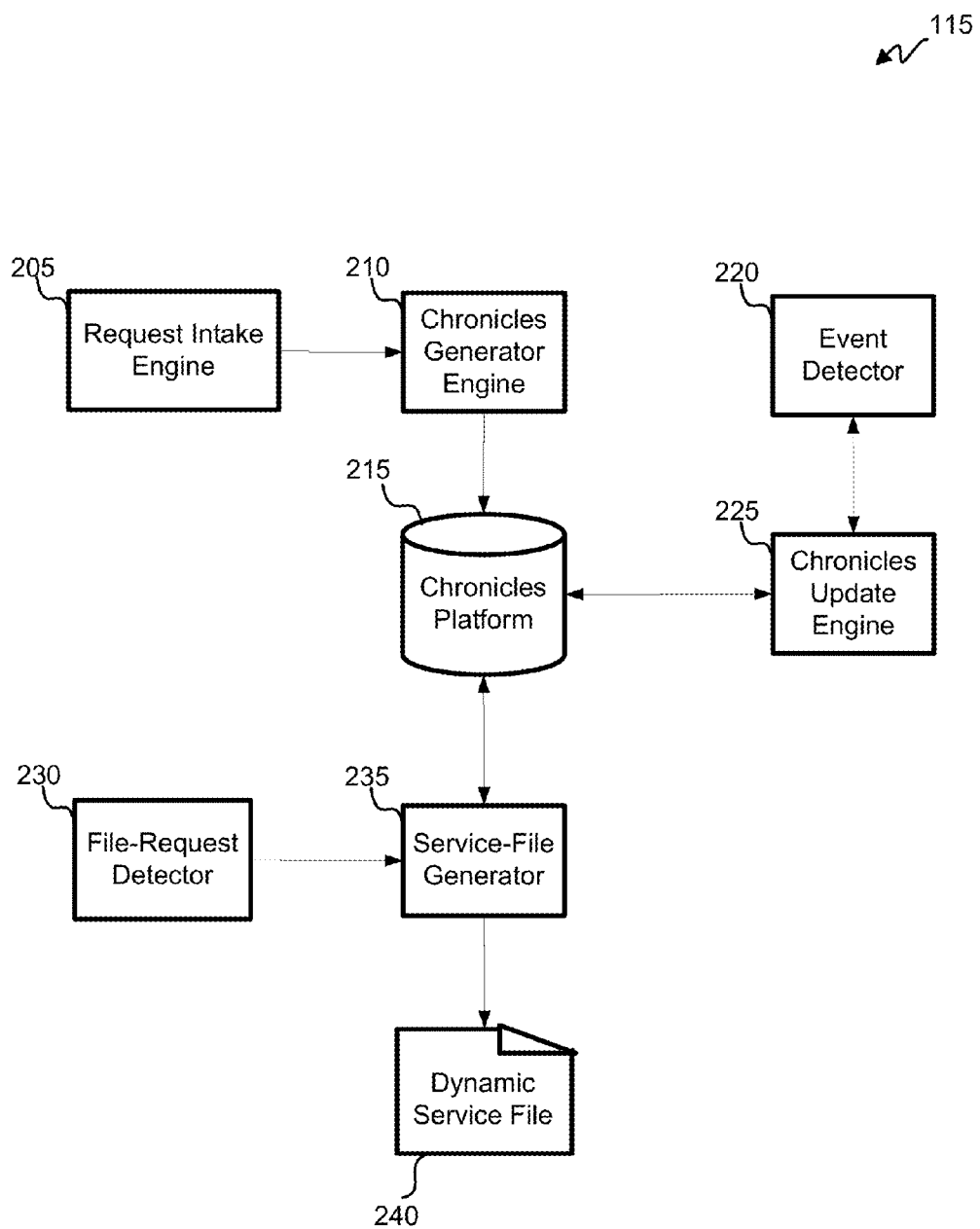
FIG. 2 depicts a block diagram of an embodiment of a service chronicle engine.

Referring next to FIG. 2, a block diagram of an embodiment of the chronicle engine 115 is shown. Generally, the chronicle engine 115 can build and maintain a chronicles platform with chronicles in the chronicles platform 215 being associated with requests (e.g., loan, admission or purchase requests), accounts, services (e.g., loans), products or interactions (e.g., interactions in which an agreement was made, a contract was executed or a transaction was performed). The chronicle engine 115 can use the chronicles platform 215 to generate, in real-time, dynamic service files 245 that provide summarized and/or detailed information about the chronicles that may be of interest to a user.

The chronicle engine 115 can include a request intake engine 205 that detects requests. The requests can be made by or on behalf of a requestor. For example, an employee (e.g., a bank employee) may load loan-application forms that indicate that an applicant would like to submit a request (e.g., thereby applying for a loan, applying for admission, requesting a product, or requesting a service). As another example, an applicant may begin entering information via an online request form. The request intake engine 205 can determine that the data relates to a new request, e.g., based on the type of information detected (e.g., loading of a "New Application" form or naming a document "Preliminary Request Form") or by conducting a search to determine whether the applicant was otherwise in the system, associated with a financial service or associated with a financial-service request. In some instances, completion of a particular form (e.g., online or using a stored template) is indicative of a new request being made.

Upon detection of the request, a chronicle generator engine 210 can generate one or more chronicles associated with the request. A chronicle can be associated with one or more entities (e.g., requestors), one or more requests (e.g., a loan request and account-opening request; or an admission request and a financial-aid request), one or more services (e.g., existing loans, credit accounts and/or debit accounts) and/or one or more products. For example, a single loan request can give rise to (in some instances) multiple chronicles: one associated with the request, one associated with a requesting entity (which can be tied to future requests), and one associated with collateral offered for the request. As another example, a single travel request can give rise to multiple chronicles: one associated with the request, on associated with a requesting entity, one associated with a flight reservation, one associated with a transportation (e.g., car-rental) reservation and one associated with a hotel reservation. In some instances, one or more chronicles are generated for every request. If the request is approved or otherwise finalized, the same chronicle or a new chronicle can be associated with a resulting service, product or transaction.

The chronicle generator engine 210 can generate a chronicle that includes information available from the detected request. For example, the chronicle can be generated to include: a requestor's name, address, phone number, email address, occupation, current or expected salary, education level, marriage status, age, grade, standardized test score(s), credit-card number, medical history, medical conditions, insurance, birthday and/or social security number. As further examples, the chronicle can be generated to include information about the requested product or service (e.g., a type of requested loan, information a purchase to be funded by a loan, a loan term and/or an interest-rate type, an alphanumeric or numeric identifier of a product, a requested payment plan, a type of government authorization requested, a time duration or content category for an advertisement requested to be inserted into other content, a type of requested admission, a proposed major, a requested scholarship and/or school-loan amount, a type of requested medical care, a requested compensation, a requested person or characteristic of a person to provide service, a requested location of service, and/or a requested date or date range for a service or product delivery). The chronicles can also include a set of content objects (e.g., documents), which can be provided by and/or completed by agents.

Figure 3:
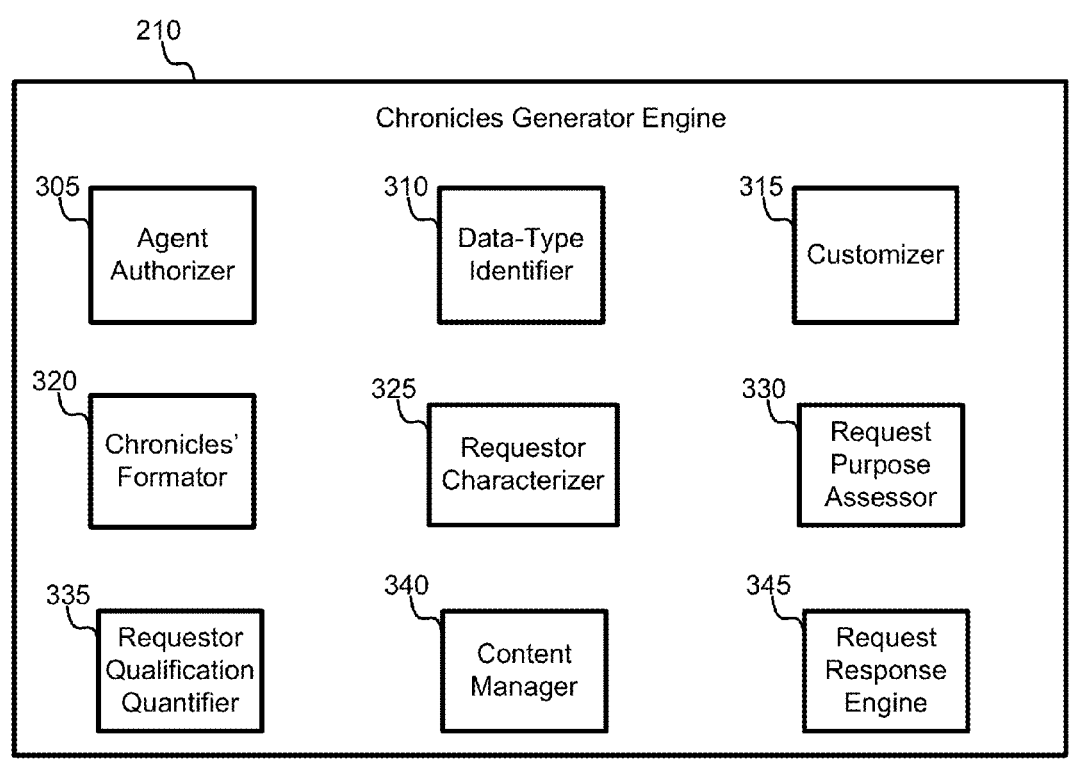
FIG. 3 depicts a block diagram of an embodiment of a chronicle generator engine.

FIG. 3 shows a block diagram of an embodiment of the chronicle generator engine 210. The chronicle generator engine 210 includes an agent authorizer 305 to ensure that an agent associated with a detected request is authorized to initiate generation of a chronicle. The agent authorizer 305 can identify an agent by, e.g., identifying who is logged in when a detected action (e.g., form upload, chronicle-generation input, or file naming) occurred, identifying a self-identification associated with the detected action (e.g., "Authorized by Joe Smith" or "Performed by Agent #135"), or parsing a form or document to identify the agent. It will be appreciated that the agent authorizer 305 can either identify and authorize an agent based on his name or based on an identification number. The agent authorizer 305 can then consult an agent registry to determine if the identified agent has a specific or general authorization to initiate the chronicle generation. For example, in one instance, "Joe Smith" can be identified as a loan officer, and all loan officers can be authorized to initiate the chronicle generation. As another example, "Joe Smith" can have authorizations to perform specific actions, one of which is initiating the chronicle generation. As another example, the agent authorizer 305 can determine that "Joe Smith" is not on an authorization list and therefore not authorized to initiate the chronicle generation. The agent authorizer 305 may further require and verify an agent-specific or general password.

In some instances, the agent authorizer 305 is integrated into the service request intake engine 205. For example, an unauthorized agent may not have the ability to upload specific content objects or use specific naming structures that would result in a detection of a financial-service request In some instances, no authorization is needed. For example, a person's partial or full completion of a form may automatically indicate a request has been made and that a chronicle is to be generated.

The chronicles generator engine 210 further includes a data-type identifier 310 that determines what type of information is to be collected for the chronicle. The data-type identifier 310 can make this determination based one or more regulations (e.g., Regulation C which implements the Home Mortgage Disclosure Act, the Equal Credit Opportunity Act, the Community Reinvestment Act of 1977, HIPPA, the American with Disabilities Act of 1990, or Proposition 209) and/or one or more policies (e.g., directed to prevent discrimination, reduce financial risk or improve market-research data). A policy can include a processing protocol (e.g., setting forth data required to mail a product or associate a reservation with a person). The data identifier 310 can identify (e.g., based on input from an operator): content objects that can, should or must be collected by institutions per the regulations or policies (e.g., specific tax forms or credit reports), data types that can, should or must be collected by institutions per the regulations or policies (e.g., a requestor's ethnicity, requestor's income, etc.), levels of distinction within a data type identified within the regulations or policies (e.g., how "ethnicity" should be defined), penalties of non-compliance with regulations set forth in the regulations and/or risk resulting from non-compliances with the policies. The data-type identifier 310 can thereafter define a list of content objects, a list of fields and/or possible field values (e.g., list options) to be collected within a chronicle. For example, the data-type identifier 310 can indicate that a chronicle is to include: a requestor's name, a loan-request amount, a loan-request type, a requestor's W2 forms for the last two tax years, and a credit report for the requestor.

In some instances, the data-type identifier 310 additionally or alternatively determines what type of information is to be collected based on user input received by a customizer 315. The user providing input can include an agent, such as an agent with particular authority to customize the content manager 315. The customizer 315 can present customization options to the user via a webpage or an application interface (e.g., to be presented on a mobile device). The user can enter data, e.g., by selecting between presented option (e.g., selecting a radio button or an item on a drop-down list) or entering a number or text. The customization can allow the user to tailor one or more aspects of the chronicle engine (e.g., formats of generated chronicles, operation of the content manager 340, formats of dynamic service files 240, agent authorizations ad/or agent responsibilities) to needs of a particular industry, institution or individual (e.g., a CEO's concerns). For example, using the customizer 315, the user can identify: what type of information and/or documents are to be collected about a requestor and/or a requested service or product, whether each information field and/or document is required or optional, a deadline for receiving information and/or a document, and/or one or more agents responsible for collecting or approving information and/or a document. The customizer 315 can further be used to define internal policies (e.g., identifying how important it is to collect various types of information and/or documents and/or identifying how important various types of information and/or documents are to approval decisions).

A chronicles' formatter 320 can identify a formatting for a chronicle. 320 The chronicles' formatter 320 can identify which types of entries may be entered for specific fields. For example, the chronicles' formatter 320 can indicate that an entry for an "age" field is to be an integer number, an entry for a "name" field is to be text string, an entry for an "occupation" field is to be a selection amongst a predefined list, and a tax form is to be a pdf document.

Once the 320 information to be collected within a chronicle has been identified, information to populate the information fields can be collected by one or more components (e.g., components of the chronicles generator engine 210 or a chronicles update engine 225, described in further detail below). The chronicles generator engine 210 can include, e.g., a requestor characterizer 325, a request purpose assessor 330 and a requestor qualification quantifier 335. Each of these components can determine specific information about a requestor, e.g., by generating one or more electronic or non-electronic forms to be completed by or on behalf of a requestor, by electronically parsing content objects or data to identify the information, by searching for the requestor within a database and/or inferring or determining the information based on other available information.

The requestor characterizer 325 can determine, e.g., a requestor's: residential area (e.g., county or neighborhood based on an address), ethnicity, race, age (e.g., based on a birthday), grade, marital status, and/or religion. The request purpose assessor 330 can determine what is being requested. For example, the request purpose assessor 330 can determine a product that a requestor wishes to purchase or a type of service requested. To specifically illustrate, in the financial-service industry, the request purpose assessor 330 may identify a requested financial-service amount (e.g., a loan amount or a credit-line amount), a type of requested financial service (e.g., loan, conventional loan, Federal Housing Administration insured loan, Veterans Affairs guaranteed loan, Financial Services Authority loan, Rural Housing Service loan, credit line, debit account, checking account or savings account), an intended use for the financial service (e.g., purchasing a 1-4 family home, purchasing a manufactured home, purchasing a multi-family property, purchasing land, improving property, or refinancing), a requested term (e.g., 5 years, 15 years or 30 years), a requested interest-rate type (e.g., floating or fixed), and/or a requested pre-approval (e.g., pre-approval requested or not). As another illustration, in the media industry, the request purpose assessor 330 may identify characteristics of an advertisement (e.g., size and/or time duration, file format and type of advertised product or service) and/or preferences for presentation of an advertisement (e.g., price bounds, expected type of viewership of content potentially surrounding the advertisement, expected number of viewers, pricing schemes, and presentation repetitions).

The requestor qualification quantifier 335 can determine, e.g., a requestor's current or expected salary, education level, savings amount, invested amount, net worth, indebtedness, credit score(s), occupation, time at current job, standardized test score, grade-point average, previous training, and/or accreditation. The information determined by the requestor characterizer 325, the request purpose assessor 330 and/or requestor qualification quantifier 335 can be used to populate field entries within a chronicle (e.g., having a format defined by chronicles' formatter 320).

The chronicles generator engine 210 can include a content manager 340 which receives and manages content objects (e.g., content files such as documents) pertaining to a request. The content objects can be stored within or associated with a storage area associated with a chronicle. In some instances, one or more other components of chronicles generator engine 210 (e.g., the requestor characterizer 325, the request purpose assessor 330 or the requestor qualification quantifier 335) determine information by extracting data from content objects managed by content manager 340. In some instances, information determined by one or more other components of chronicles generator engine 210 is used to populate content objects managed by content manager 340.

Figure 4:
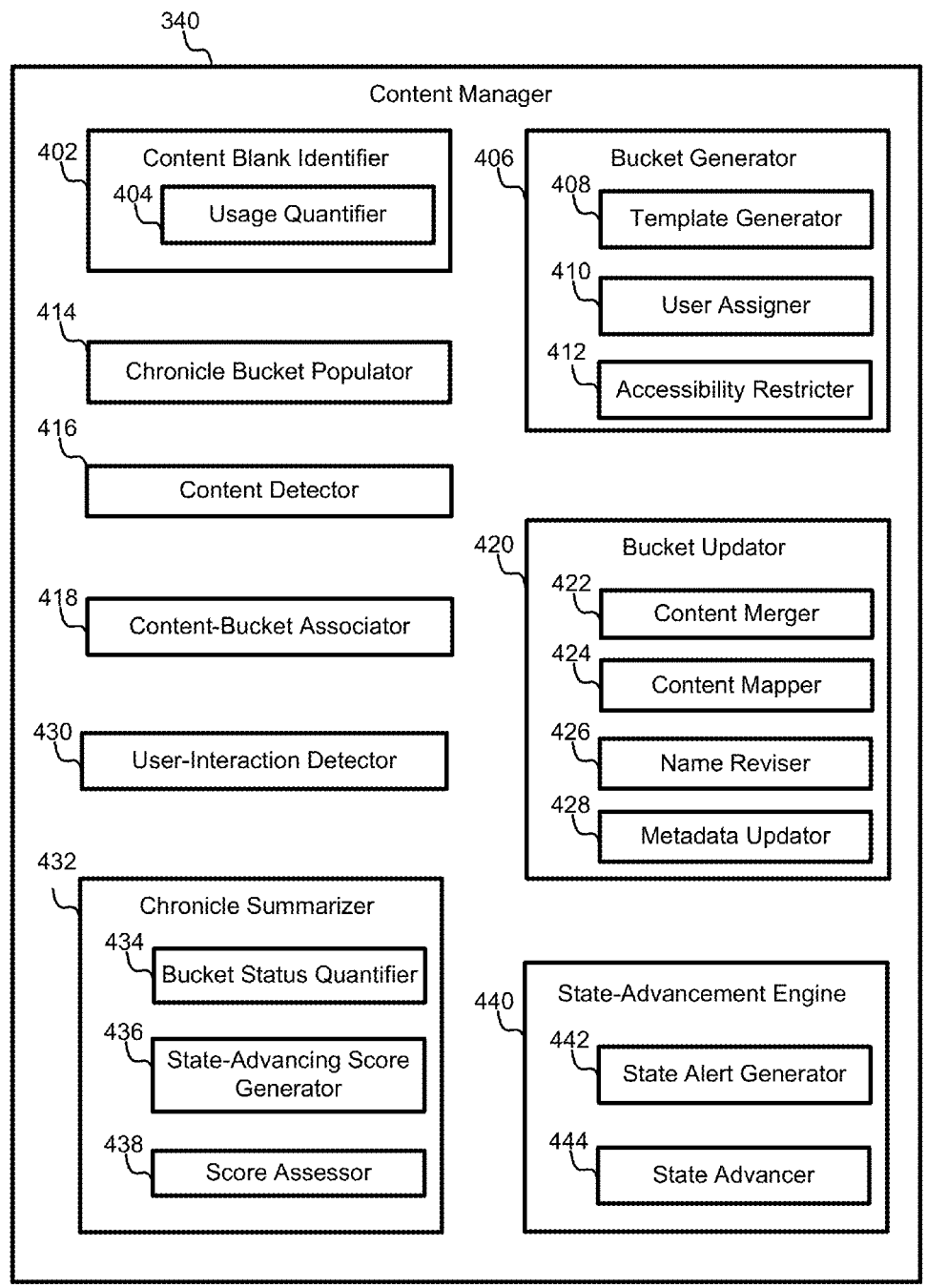
FIG. 4 depicts a block diagram of an embodiment of a content manager.

FIG. 4 shows a block diagram of an embodiment of the content manager 340. Content manager 340 can manage content associated with one or more storage area, such as a storage area associated with a chronicle. One or more devices (e.g., a single computer, a network of computers, a cloud computing system) can provide the storage area. The storage area can be predefined (e.g., allocated a predetermined storage space) or dynamically defined (e.g., allocated successively more storage as content is added to the storage space or repeatedly redefined as content objects already stored are associated with the storage area). Each storage space can be associated with one or more chronicles, and thus can be associated with one or more accounts, entities (e.g., a requestor, client or an institution), physical items (e.g., collateral or requested product), policies, internal regulations, external regulations, and/or regulatory authorities. For example, a content manager 340 used by a bank can manage a plurality of chronicles, each chronicle being associated with a potential or existing account with the bank.

The content manager 340 includes a content blank identifier 402 that determines required and/or optional contents to be included in and/or associated with a chronicle. The content blank identifier 402 can generate one or more lists of content-object blanks. This list is a "blank" list, in that the content objects need not exist (and, in some instances, do not exist) before they are identified. The list can include content objects that are allowed to be associated with a chronicle and/or that are required to be associated with a chronicle. In some instances, different lists identify the blanks for required content objects and for optional content objects. One, more or all generated lists may or may not be comprehensive. For example, if a chronicle is associated with a non-comprehensive set of lists, a content object not identified in the lists could nonetheless be stored in and/or associated with the chronicle.

The content blank identifier 402 can determine which content blanks to include in the lists by, e.g., reviewing a characterization of the chronicle, receiving user input, accessing data regarding applicable regulations or quantifying usage patterns. The user input can include high-level or low-level input. For example, in some instances, a programmer defines lists to be associated with different types of chronicles (e.g., a first list to be associated with a loan-request/loan chronicle, a second list to be associated with a checking-account chronicle, a third list to be associated with a bank-solvency-assessment chronicle, etc.). The content blank identifier 402 can thereafter identify an appropriate content-blank list by looking up the list(s) associated with a particular chronicle type. In a similar instance, a client (e.g., a bank official or employee) can define or adjust the chronicle-type-dependent lists (e.g., during an initiation of content manager 340 or during an organizational update), as described in further detail below. As an example of use of low-level input, the list could be defined based on user input (e.g., from a client) upon an initiation of an individual chronicle. Thus, the higher-level user input generalizes lists across a set of potential chronicles, while lower-level user input is tied more closely to a specific chronicle.

The content blank identifier 402 can communicate with data-type identifier 310 to automatically identify part or all of the content blanks to include in the list. For example, the data-type identifier 310 can look up one or more policies or regulations associated with a chronicle or type of chronicle. The regulations can include internal regulations (e.g., good-practice regulations) or external regulations (e.g., regulations set by a government agency). The identified regulations can be full regulations or processed regulations (e.g., identifying requirements, such as required documentation, set forth in the regulations). The data-type identifier 310 can analyze the identified regulations and/or policies to determine content objects applicable to a specific chronicle or type of chronicle. In some instances, the data-type identifier 310 identifies content objects directly identified in a regulation. In some instances, the data-type identifier 310 identifies data types required by the regulation and thereafter determines content objects that will or are likely to include the data types. The data-type identifier 310 can then transmit the determinations to the content blank identifier 402 of the content manager 340.

The content blank identifier 402 can further or alternatively determine the content blanks based on usage patterns. As shown in the embodiment of FIG. 4, the content blank identifier 402 includes a usage quantifier 404, which quantifies historical usage properties. For example, a default content-blank list can be identified based on a particular type of chronicle and/or applicable policies or regulations. The usage quantifier 404 can determine that users interact with some content blanks very rarely, interact with some content blanks routinely, and further interact with other content objects not identified in the default content-blank list frequently. Usage quantifier 404 can then revise the default content-blank list to remove those content blanks which users seldom interacted with and to add content blanks associated with the other content objects.

After the content blanks have been identified, a bucket generator 406 can generate a bucket for each content blank. A generated bucket can include a name of a content object and one or more properties of the content object. For example, the bucket can indicate one or more acceptable file types, user assignments, user authorizations, and/or date restrictions. The bucket generator 406 includes a template generator 408, which can generate a template for a content object to be associated with the bucket. For example, the template can include a document or program that requests specific data entries from a user (e.g., "Applicant's Birthday: _____" or "Enter Applicant's gross salary from 2011"). The templates can include hard-copy or electronic forms to be completed by or on behalf of a financial-service requestor or by a third party (e.g., a credit bureau). For example, the document templates can include pdf documents, fillable pdf documents, Word documents, Excel documents, or code for an online form. The generated templates may or may not be partly completed (e.g., based on available information about a request). The generation of templates can allow for uniform and consistent naming and information across requests.

In some instances, the template generator 408 generates an example of a content object. For example, the example template can include: "Applicant's gross salary from 2011: $120,000". The content object can be configured such that example data can be over-written and such that example data and subsequently entered data is presented in different manners (e.g., the example data being highlighted in gray or italicized).

The bucket generator 406 includes a user assigner 410 which can identify a user assignment or set of user assignments to be associated with the bucket. User assignments can indicate which users are assigned to tasks such as uploading the content object, inputting data into the bucket, reviewing the content object, and/or approving the content object. Each user assignment can include a specific user's name, title and/or contact information (e.g., phone number or email address); an identifier (e.g., a numeric identifier) associated with a specific user; and/or a type of user (e.g., Bank CFO). The user assignment can further include the type of assignment (e.g., uploading, editing, reviewing or approving).

The bucket generator 406 includes an accessibility restricter 412 that can identify which users are authorized to perform specific actions for a bucket. For example, the accessibility restricter 412 can indicate which users can upload a content object, view a content object, edit a content object, approve a content object, comment about a content object, see a summary based on the content object, view an existence of a bucket associated with a content object, or view a status of a bucket associated with a content object. The accessibility restricter 412 can identify one or more specific users (e.g., only Bob Smith can approve the content object), one or more user criteria (e.g., all Level 3+ employee agents can edit the content object), or implement a default (all users can view the content object).

Thus, in some instances, a generated bucket can include an incomplete content object (e.g., a template) but need not. In some instances, the generated bucket includes data other than a content object, such as metadata identifying user assignments or accessibility restrictions. The metadata can further indicate a status of a bucket such as empty, partly full (e.g., template created), full, finalized, edited, reviewed, or approved.

Upon generation of one or more buckets, a storage area associated with a chronicle can be populated by a chronicle bucket populator 414 to include the buckets. This population can include saving content objects and/or other data to a storage area associated with a chronicle or otherwise associating the content objects and/or other data with the chronicle (e.g., via mapping). The buckets can be presented (e.g., visually identified) to some or all users subsequent to the population. For example, an authorized user who looks up Chronicle X (e.g., by opening an electronic folder associated with Chronicle X) could see 15 empty buckets and 3 template-filled buckets subsequent to the population. Other data pertaining to the buckets (e.g., user assignments or appropriate content-object types to fill the buckets) can further be presented to some or all users (e.g., by visually presenting this information within a representation of the bucket or by presenting the information subsequent to user actions such as right-clicking on a presented buck and selecting a "Properties" option). Buckets may be invisible to or locked from users not authorized to view content objects of the bucket.

The content manager 340 includes a content detector 416 that can detect a content object. The detection can include detecting that a new content object is being created (e.g., a user is opening a blank document generally, in a particular program or meeting other criteria), detecting that a user is attempting to save a content object (e.g., generally or within a specific storage area associated with a chronicle), detecting that a content object has been uploaded or otherwise received (e.g., via an electronic transmission over the Internet), detecting that a user is attempting to move a content object (e.g., to a specific storage area associated with a chronicle), or detecting that a user is attempting to rename a content object.

A content-bucket associator 418 can identify a bucket and/or chronicle to be associated with the detected content object. The association can be automatically determined or determined as a result of user input. For example, the content-bucket associator 418 can analyze which user is attempting to save the content object, identify user assignments assigned to that user, identify the type of content object, and/or extract data from the content object indicating an applicant's name, and thereafter determine the appropriate bucket. As another example, a user can be prompted to select an appropriate chronicle and then an appropriate bucket (e.g., upon trying to open a new content object or save a content object). As another example, a user can drag and drop a visual representation of a content object into a visual representation of a bucket.

In some instances, content-bucket associator 418 determines that a content object is not to be associated with any existing bucket and/or chronicle. For example, automatic analyze can indicate poor matches between data associated with the content object and existing buckets and/or chronicles or a user can indicate that the content object corresponds to a "new" bucket or chronicle. In these instances, a new bucket can be generated by bucket generator 406 to be associated with the content object. A user can provide information, such as the bucket's name and properties, or this data (e.g., metadata) can be extracted from the content object.

A bucket updator 420 can then update data associated with a chronicle and/or bucket to include the content object or to include an identification (e.g., a storage location) of the detected content object. In some instances, the bucket updator saves the content object within a storage area associated with the bucket and/or chronicle. The saving can include an initial saving of the content object, resaving the content object (thereby duplicating the content object) or resaving the content object and deleting the original. The bucket updator 420 includes a content merger 422 that can merge content from a content object to a bucket. For example, detected content object can include a list of information (e.g., generated in response to a program's execution). The information can be used to fill in blanks in a bucket's templates. As another example, the content merger 422 can move or copy metadata associated with a bucket to be included in metadata associated with the content object.

In some instances, the bucket updator 420 includes a content mapper 424 that identifies a storage location of the content object. The mapped storage location can be stored in a storage location associated with a bucket or chronicle or in a central location. For example, a look-up table can store, for each of a set of chronicles, maps created for content objects associated with the chronicle.

The bucket updator 420 includes a name reviser 426 that revises a default name (e.g., "Document 1" or name used during a previous save) to a name associated with a bucket. For example, a user can select a visual representation of "Credit Report" content object and drag and drop it into a "Credit Report-1" bucket for a chronicle, at which point the content object can be renamed to be "Credit Report-1" or to another name as identified based on metadata associated with the bucket.

The bucket updator 420 further includes a metadata updator 428 that updates metadata associated with a bucket. For example, after a content object is saved within a bucket, a status of the bucket can be updated to reflect that the bucket is filled. The metadata can further reflect a date of the bucket's update and an agent initiating and coordinating the update. The metadata can further indicate a next action (e.g., "Approval by Agent X pending.").

The content manager 340 includes a user-interaction detector 430 which detects interactions between a user and a bucket. In some instances, these types of detected interactions lead to a detection of content by the content detector 416. Alternatively or additionally, these interactions can result in further updates implemented by the bucket upator 420. For example, the user-interaction detector 430 can detect a user, an interaction time and an interaction type associated with one or more types of interaction. The user can be identified based on a user logged into a system, an IP address, or a self-identification. The interaction type can include viewing data (e.g., metadata) associated with a bucket, viewing a content object associated with a bucket, editing a content object associated with a bucket, making a comment regarding a content object associated with a bucket, approving a content object associated with a bucket, locking a content object associated with a bucket (such that it can no longer be edited or deleted), or deleting a content object associated with a bucket. Comments made by users do not result in a modification of the actual content object but are rather associated with the content object at a higher layer. The comments can be available to some agents, and not to others. For example, a comment can be made by one agent for another agent, such that the note is only available to the two agents. In some instances, a detected interaction includes a failed attempt to perform an interaction that, e.g., failed due to a lack of user authorization to perform the interaction. Interactions (or failed interaction attempts) can result in the metadata updator 428 updating metadata associated with a bucket (e.g., to identify the interaction or update the bucket's status).

The content manager 340 includes a chronicle summarizer 432 that summarizes a state of a chronicle. The chronicle summarizer 432 can include a bucket status quantifier 434 that determines which buckets, of the buckets associated with a chronicle, meet a particular status criterion. For example, the bucket status quantifier 434 can determine what fraction (or number) of the buckets are empty, what fraction (or number) of the buckets are filled and/or what fraction (or number) of the buckets are filled. The bucket status quantifier 434 can determine a fraction of the buckets that meet at least a threshold status along a status hierarchy (e.g., being at least filled). The bucket status quantifier 434 can determine a distribution of statuses (e.g., 42% empty, 35% filled, 13% filled and edited, and 10% approved). In some instances, the quantification accounts for whether a status of a bucket must be met or may be met. For example, Chronicle X could include 15 buckets that must be filled and approved, 5 buckets that are preferably to be filled and approved, and 10 buckets that may be filled and approved. The bucket status quantifier 434 can summarize the status for one, more or each of these bucket groups. The bucket status quantifier 434 can further identify agents or agent types responsible for buckets that have not reached a desired status.

The chronicle summarizer 432 further includes a state-advancing score generator 436 that generates one or more scores relevant to an issue as to whether a state of a chronicle should be advanced. For example, a "loan request" chronicle may be associated with potential states of: initial data entry, pre-authorization decision, subsequent data entry, loan-detail calculations, actual authorization decision, loan completion, and loan pay-off period.

Each state transition can be associated with one or more criteria pertaining to a state of the chronicle. For example, the criteria can indicate requisite statuses of one or more buckets. The criterion can be stored in a state-advancing criteria database, which can include general criteria, state-advancing criteria for different kinds of chronicles or state-advancing criteria for specific chronicles. The criteria can be set by user agents (e.g., authorized employee agents), by analyzing applicable regulations and/or based on usage patterns (e.g., identifying properties frequently associated with chronicles at a time that a user authorized their state advancements). A chronicle may, in some embodiments, need to advance through each state in order to progress to the next state. In some embodiments, the chronicle can skip states if it meets entry criteria of the final state.

The state-advancing score generator 436 can assign points to a chronicle based on properties of the individual buckets or groups of buckets. For example, a point can be assigned to each bucket that is filled, and two points can be assigned to each bucket that is filled and approved. As another example, a point can be assigned if each "required" bucket is filled. As yet another example, a point can be assigned for each state-advancing criterion that is fulfilled (e.g., "At least one of Buckets 1-5 filled", "Each of Buckets 6-8 filled and approved", "Bucket 10 edited and finalized by Agent #105). The assigned points can be added together, added together within groups (e.g., each group pertaining to one criterion) or kept separately.

A score assessor 438 can assess the generated score(s) in order to determine whether the chronicle is eligible to advance states. The score assessor can compare the score(s) to one or more thresholds. The thresholds can be identified in state-advancement criteria. The score assessor 440 can determine, e.g., whether a chronicle is eligible to advance to a next state or which state the chronicle is eligible to advance to (e.g., allowing state jumps).

A state-advancement engine 440 receives the chronicle summary generated by the chronicle summarizer 432 and determines whether the chronicle is to advance states. In some instances, the state advancement is automatic upon a determination that the chronicle has met state-advancing criteria. For example, if the score assessor 438 determines that the state-advancing score exceeds an applicable state-advancing threshold, the state can be automatically advanced.

In some instances, a user must authorize the advancement. Upon a determination by the score assessor 438 that a chronicle is eligible for state advancement, a state alert generator 444 can generates and transmits an alert identifying the eligibility. The alert can identify the chronicle, a summary of bucket statuses of the chronicle, a current state, a potential next state, a state-advancement criterion, and/or the state-advancing score. The alert can be transmitted to an agent authorized to authorize the state advancement. The state-advancement engine 440 can be notified if and when the authorized user authorizes the state advancement.

Upon a detection of the automatic advancement criteria being fulfilled or a notification that a user authorized the advancement, a state advancer 444 can advance a state of the chronicle. In some instances, a result of the advancement is that the content blank identifier 402 identifies new content blanks, the bucket generator 406 generates new buckets and/or the chronicle bucket populator 414 populates the chronicle with the new buckets. In some instances, a result of the advancement is that the bucket updator 420 updates metadata of one or more buckets to include new expected bucket statuses and/or user assignments. In some instances, a result of the advancement is that an automatic analysis (e.g., a suggested request-approval-decision analysis or analysis identifying a type or cost of an available service or product) be initiated.

Thus, the content manager 340 allows a series of chronicles to be uniformly organized and managed. Content objects within each chronicle can be consistently named and easily searched, and state-advancement criteria can be easily and consistently applied.

FIGS. 5A-5D show examples of an interface 500 presenting a content manager in operation. These particular example illustrate a content manager interface 500 in the financial-service industry, though it will be appreciated that similar interfaces can be provided for different industries (e.g., with different content-object names, different content-object types, different types of owners 53-0, etc.). The interface 500 presents information about content existing for an account, client, etc. and about content that can or is required to exist for the account, client, etc. The information can relate to all content associated with the account, client, etc. or content falling within a particular category. For example, categories can include a small-business loan application, financials, borrower detail, affiliate financials, corporate documents, real estate, leases, refinance, purchase contracts, insurance, equity injection other or underwriting. For a particular account, one or more categories can be inapplicable. The categories can be predefined or defined by a user and can be defined generally or for specific accounts, clients, etc.

In this instance, the interface 500 presents a list of content-object names 505. The list includes names of content objects associated with an account. The names can be standardized, such that different accounts include content objects with similar or same names.

The interface 500 further includes textual status indicators 510 and graphical status indicators 515. Textual status indicators 510 can include, e.g.: open, indicating that a content object has not been uploaded; in-file, indicating that a content object has been uploaded but that no additional action has been taken; reviewed, indicating that a content object has been reviewed but a potential outstanding issue remains; approved, indicating that a content object has been approved and is thus finalized (e.g., disallowing renaming, uploading over or modifying except by those with approve authority; and exception, indicating that a content object is an exception.

Graphical status indicators 515 can be tied to textual status indicators 510 (e.g., having a different graphic associated with each textual status) or not. For example, in some instances, a check mark indicates that a textual status is satisfactory to move to a next progression level for the account and an exclamation mark indicates that a textual status is unsatisfactory for this purpose.

The interface 500 also indicates a content-object format 520. The content-object format 520 can be graphically represented (e.g., as in FIG. 5A) or textually represented. In some instances, the content-object format 520 is only represented when a content object has been uploaded. In other instances, the content-object format 520 indicates a format of a template or a required format for a content object to be uploaded.

The interface 500 indicates a content-object type 525. The type 525 can be associated with content categories. For example, in the example of FIG. 5, if a user requested to only view content-object data for the "Financials" category, information about the "BTR—Port City Coffee—2011" content object would be presented, but not information about the "Proposal" document.

The interface 500 further presents an indication about an owner 530 of the content object. The owner can include an agent assigned to a next applicable task for the content object, an agent who performed a past (e.g., most recent) task for the content object, or an agent who uploaded the content object. An owner can include an agent of a following type: closer, compliance, loan operator, attorney, construction, special assets or servicing. Owner categories can be generally defined or defined for specific accounts. Similarly, owner assignments can be generally defined or defined for specific accounts. In some instances, some content objects have an assigned owner (e.g., responsible for a next task) while others do not.

A priority indicator 535 can indicate a priority of a document. The priority indicator 535 can be descriptive (e.g., high, medium or low) or numeric. The priority indicator 535 can be functional, indicating which content objects are required versus desired or optional. In some instances, a priority indicator 535 indicates a content object for which a next action should be performed (e.g., a flag next to a specific content object indicates that that is the next content object needing an action, such as uploading a document or approving an object). Priority indicators 535 may further identify a ranking of documents (e.g., such that it is required or suggested that an action be performed for object with ranking of "1" before an action is performed for object with ranking of "2").

A date field 540 can indicate, e.g., a date of a last action and/or a deadline. For example, a date in green font can indicate the date of a last action meeting a requirement for the content object, and a date in red font can indicate a deadline for a requirement for the content object.

An exception date 545 can indicate a date on which an exception was made for the content object. The exception can indicate that a standard protocol for the content object should not apply. For example, the exception can indicate that a required content object is not needed for a particular account, that a deadline is to be extended, that an optional content object is required, etc.

The interface 500 can include a comment field 550, which can indicate a date and time that a comment was made, who made the comment, and a status of the content object when the comment was made. In some instances, all or part of the comment itself (or a shorthand of the comment) is immediately visible. In some instances, the comment becomes visible upon mousing over the comment, double clicking on the comments, etc.

As shown in FIGS. 5B and 5C, a user (e.g., an authorized user) may be able to interact with the content manager to set a value for one or more fields. For example, in FIG. 5B, a user can click on the owner field 530 for a particular content object. If the user is authorized to set the owner, a drop-down box appears and a user can select an appropriate owner. As another example, in FIG. 5C, a user can click on the date field 540 for a particular content object. If the user is authorized to set the date, a calendar appears and a user can select an appropriate date.

Figure 5D:

FIG. 5D shows an example of a comment entry. A user can enter a comment by, e.g., accessing a content object and entering a comment while viewing the object. Alternatively, the comment can be entered within a more global representation of the content manager. For example, a user can click on a comment field 550 for a particular content object. If a comment exists and the user is authorized to view it, the comment can thereafter appear. If no comment exists and the user is authorized to make a comment, a blank comment box 570 can appear in which the user can input a comment.

Operation and/or structure of the content manager 340 can depend on input defining customization received by the customizer 315. For example, a user can identify (via the customizer 315) content-object blanks to be associated with one or more chronicles. The identified blanks can be a comprehensive list (such that the content blank identifier 402 identifies one or more lists of content-object blanks based on the user input) or can be a list which is supplemented or pruned by the content blank identifier 402. The user can identify a content-object blank by identifying, e.g., a name, a file type, size bounds, one or more assignments and/or assigned agents (e.g., to be modified by any employee agent and to be approved by any supervisor agent), a chronicle status criterion or threshold status to be associated with a bucket for a content object (e.g., whether the content object must be completed or approved or whether such completion or approval is optional), a deadline (e.g., indicating that one content object must be uploaded before another, or that one content object must be uploaded within 15 days of completion of another), a chronicle association (e.g., which types of chronicles are to include the content-object blank), and/or an initial bucket status (e.g., whether the bucket will be empty or whether the bucket will be filled with a template or example object).

Based on this information, the bucket generator 406 can appropriately generate buckets for one or more chronicles and the chronicle bucket populate can populate a storage area with the buckets. The information can also be used by the content bucket associator 418 to determine which bucket and/or chronicle a content object is be associated with and can further by used by the bucket updator 420 to, e.g., determine how to revise a name or update metadata. The information can further be used by the chronicle summarizer 432 and/or the state-advancement engine 440 to determine a bucket status, whether a bucket meets a status criterion, and whether a chronicle should be advanced states.

Returning to FIG. 3, the chronicles generator engine 210 also includes a request response engine 345 that can determine (e.g., automatically determine) a preliminary or final response to a financial-service request. In some instances, the response is only determined once required information and/or required content objects have been received. Notably, which information and/or content objects are required may depend upon whether a requestor is seeking pre-approval. For example, a pre-approval may require less information and/or content objects as compared to an actual approval, so the pre-approval response may be made prior to a final response. In some instances, a preliminary response may be determined even prior to receipt of the required information and/or content objects. In some instances, the request response engine determines a score for the requestor based on the information within the generated chronicle. The score can be compared to a threshold to determine a suggested or actual response.

The response can include a discrete (e.g., binary) decision, such as approval or rejection and/or may include details about details pertaining to service or product that can be provided in response to the request. For example, the response can include a price, an expected date or date range of service, an expected delivery date, an interest rate, a scholarship amount, a number or time-range of licenses, a contract duration, an entity (e.g., person or company) or type of entity which can provide a requested service, an amenity type (e.g., a type of hotel room), and/or a required down-payment or security.

The response determined by the request response engine 345 may or may not be presented (e.g., via a webpage or other interface) to a requestor or person acting on behalf of the requestor. In some instances, an internal agent (e.g., bank employee) may need to review and approve (or adjust) the response prior to finalizing and presenting the response.

Referring next to FIG. 6, an example of an overview of a generated chronicle 600 in a financial-service industry according to an embodiment is shown. The overview 600 can be built from data entered by one or more agents or from data extracted from one or more content objects. The first section of the overview 600 includes information about or provided by a requestor. The information can include identification information (e.g., name and social security number), characteristics about the requestor (e.g., ethnicity, race and sex), request purposes (e.g., use of proceeds, loan type and property type), and the requestor's qualifications (e.g., gross annual income). The second section of the overview 600 includes information obtained from third parties, such as credit bureaus. For example, the overview 600 can include credit scores, appraisal values, outstanding debt, etc. These variables can be extracted from content objects associated with the chronicle. The third section of the overview 600 can include automatically calculated variables or variables determined by an internal agent (e.g., an employee of a financial institution). For example, the variables can include an interest rate, mortgage payment, debt-to-income ratio, down-payment percentage, a score associated with the request, and a suggested action based on an automated calculation.

In the depicted instance, not all fields of the overview 600 are completed. For example, the "race" of the requestor is not completed. The consequence of the incompleteness can be determined, e.g., based on the chronicles' formatter 320. For example, if the chronicles' formatter 320 determines that "race" is a required field, then (in some instances), no action can be taken until the field is completed. The overview 600 is exemplary. In other embodiments, the overview 600 can include additional information such as a list of required content objects, a list of uploaded content objects, a list of missing content objects, and a list of all agents interacting with the chronicle and the type of interaction.

As shown in FIG. 2, the generated chronicle 600 can be stored within a chronicles platform 215. The chronicles platform 220 can include chronicles associated with different requests, products, services, accounts, entities and/or transactions. As noted above, a generated chronicle may or may not be complete. In many instances, it will be incomplete due to information and/or content objects that will need to be gathered by the requestor and/or from third parties.

Figure 7:
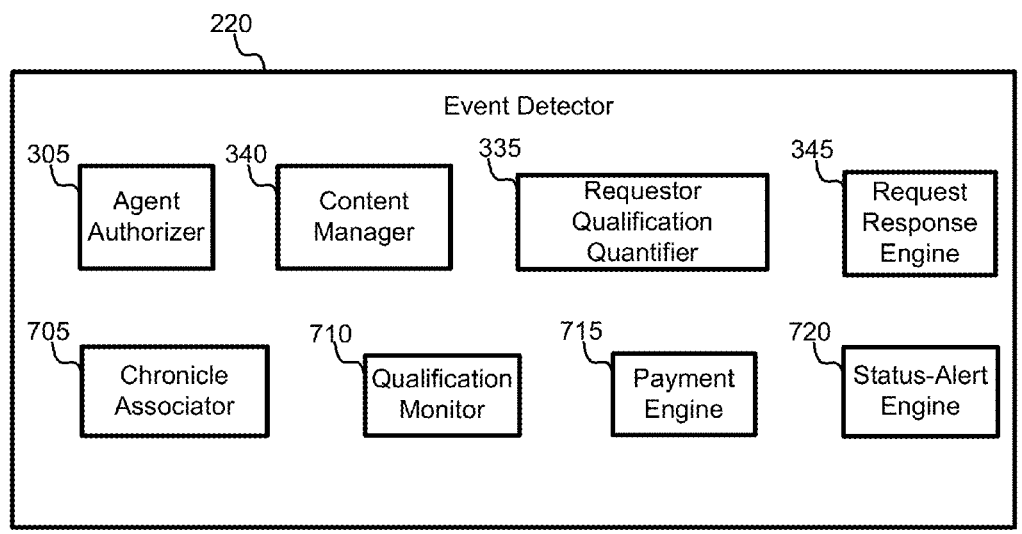
FIG. 7 depicts a block diagram of an embodiment of an event detector.

An event detector 220 can detect events such as uploaded content objects, interactions with chronicle-associated content objects (e.g., approvals), or newly entered information. FIG. 7 shows a block diagram of an embodiment of the event detector 220. The event detector can include a number of components similar to or the same as components of the chronicles generator engine 210. For example, the event detector 220 includes an agent authorizer 305 to ensure that the entity performing an action (e.g., uploading a document, approving a document or entering information) has the authority to perform the action and/or the authority to cause a modification to a chronicle. The event detector 220 further includes a content manager 340 to generate buckets, detect new content objects, modify existing content objects, change statuses of existing buckets (to "approved"), or note interactions with buckets.

The event detector 220 includes a requestor characterizer 325 (not shown), a request purpose assessor 330 (not shown) and/or a requestor qualification quantifier 335 to collect and process new information for a chronicle. For example, the requestor qualification quantifier 335 can determine a qualification score based on newly received expected income levels, tax returns and/or credit scores. The event detector 220 includes a request response engine 345 such that a request response can be generated or updated based on the detected event. The request response engine 345 can initiate generation of the request response immediately (e.g., following a detected event) or at some time in the future (e.g., in order to manage service-level agreement workflow).

The event detector 220 includes a chronicle associator 705 that associates a detected event with a generated chronicle. The association may be determined by searching for a chronicle with a number the same as a number identified in the detected event, for searching for a name, or by searching for a social security number. Thus, the detected events can be paired with a chronicle, such that an appropriate chronicle can be updated based on the newly obtained information.

The event detector 220 can include one or more monitors, such as a qualification monitor 710. The qualification monitor 710 can monitor a qualification parameter, such as a salary, indebtedness, bank-account balance or credit score, to determine whether the parameter varies beyond an expected value or changes by a threshold amount from a past value. For example, the qualification monitor may monitor tax returns to determine whether a salary drops below an expected level or qualification level, or the qualification monitor may monitor a bank account to determine whether the bank account drops below an expected level or qualification level.

The event detector 220 can further include components that operate after a request has been completely processed. For example, after a request approval, a request can be converted into a an account indicative that an institution will provide a service or product in expectation of in response to receiving one or more payments. A payment engine 715 can monitor payments received by a customer. The payment engine 715 can identify payment dates, times and amounts. The payment engine 715 can further determine when payments were due and the amounts due to determine whether the received payment was timely and complete. For example, the payment engine 715 can access a chronicle to determine a payment schedule to identify a most recent or next payment due date. The payment engine 715 can further determine when a payment is late or missing.

The event detector 220 further includes a status-alert engine 720 that can produce an alert based on a change in a chronicle status. For example, the status-alert engine 720 can indicate that all requisite information and document have been received, that a response decision can be made, that an account is delinquent, that an applicant's or customer's qualification status changed, that a request has been pending for more than a threshold time period, or that a request response is contrary to an automatically recommended response. The status alert can be presented (e.g., displayed or emailed) to one or more agents, such as an agent internal to a financial institution operating the financial-service chronicle engine 115.

Returning to FIG. 2, upon detection of the event, a chronicles update engine 225 can update the associated chronicle within the chronicles platform 215. For example, the chronicles update engine 225 can populate and/or update values in fields within chronicles platform (e.g., associated with content objects or independent fields characterizing a loan applicant or a loan request) defined by the chronicles' formatter 320 of chronicles generator engine 210. Thus, a single chronicle maintains current information and content objects associated with a request. If the request is approved and a service or product is or is to be provided (or offer details are identified), the chronicle can then be associated with the service, product or offer rather than the request (though request-related information and content objects may remain a part of the chronicle). The platform thus enables an entity to retrieve all information related to a request or financial service and to ensure that the information is collected in a consistent manner. Further, inter-chronicle consistency can provide for search capabilities and inter-chronicle summaries, as described in further detail below.

The chronicle engine 115 includes a file-request detector 230 that detects an event that initiates generation of a dynamic service file 240 that characterizes one or more chronicles. For example, the file-request detector can detect a request received by an agent 105 (via an interface 110) for a dynamic service file 240. The request may generally request the dynamic service file 240 or request specific types of information to be included in the dynamic service file 240. For example, the detected request may include a request for a dynamic service file 240 that groups and summarizes chronicles based on a branch, office or agent associated with the chronicle (e.g., with the generation of the chronicle or which would be providing or coordinating providing of a service or product in response to the request), a requestor's ethnicity, a requestor's geographic residence region, or a requestor's qualifications. The detected request can further include, e.g.: a requested summarization level (e.g., where a high level includes summary statistics about a group of chronicles, and a low level includes detailed information about the individual chronicles within the group), requested types of summarization variables (e.g., averages, medians, distribution statistics, distributions, p-values, or p-value tests), requested types of parameters to be summarized (e.g., request response, request response time, interest rate or number of requests), and/or presentation types (e.g., bar graphs, numeric lists, text, pie graphs, line graphs, or overlapping versus side-by-side graphs).

In some instances, file-request detector 230 detects that a criterion associated with generation of a dynamic service file 240 has been satisfied. For example, a criterion can indicate that a particular agent or a type of agent (e.g., a loan officer) is to be notified once a chronicle has reached a particular completion point (e.g., once it includes specific data and/or content objects). A dynamic service file 240 can then be generated for one or more chronicles satisfying one or more criteria. In some instances, the number of chronicles contributing to a dynamic service file 240 is determined based on an assignment of an agent to the chronicles. For example, a dynamic service file 240 can be generated to summarize all chronicles for which Agent Joe Smith is the designated loan officer and for which a chronicle completion criterion has been met within the last 7 days. As another example, a dynamic service file 240 can be generated for each chronicle for which Agent Jane Knoll was a credited salesperson associated with a transaction that was initiated within the last month for any product in a product line. Chronicles can themselves include the criterion and/or identify agents to be notified upon satisfaction of the criterion.

Figure 8:
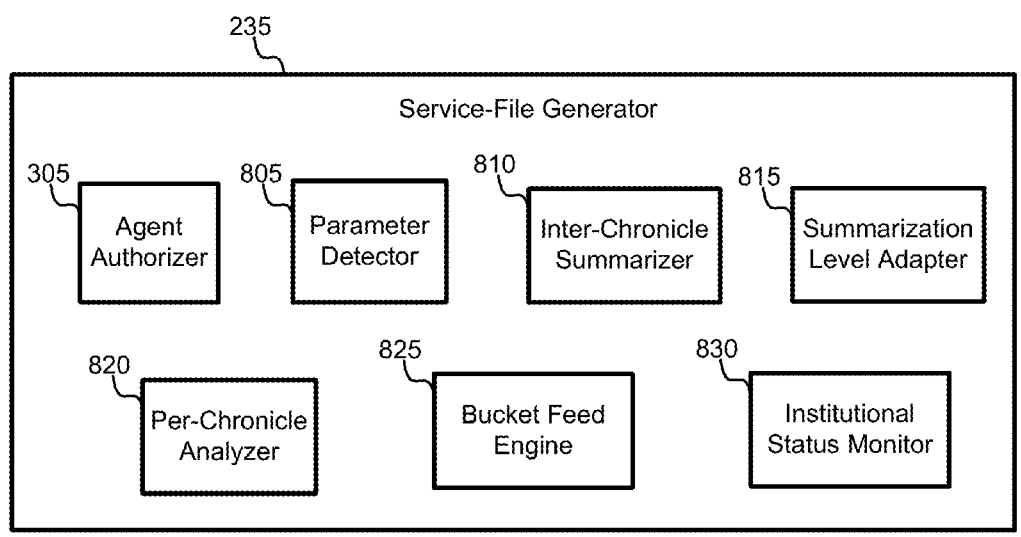
FIG. 8 depicts a block diagram of an embodiment of a service-file generator.

Upon detection of the request for the dynamic service file 240, a service-file generator 235 can process the request and generate the dynamic service file 240. FIG. 8 shows a block diagram of an embodiment of the service-file generator 235. The service-file generator 235 includes an agent authorizer 305 to determine which information an agent requesting the dynamic service file 240 can view. For example, the agent authorizer 305 can identify an agent by, e.g., identifying who is logged in when the dynamic service file 240 was requested, an identified username or name, or looking up an IP address associated with the request. The agent authorizer 305 can then consult an agent registry to determine if the identified agent has a specific or general authorization to receive dynamic service files 240 and/or which information may be presented in the dynamic service file 240 for the particular agent. For example, in one instance, the agent authorizer 305 can identify "Joe Smith" as a CEO of an institution and can further identify that all officers of the institution have full access to all information in dynamic service files. Thus, the agent authorizer 305 can determine that Joe Smith can request and receive any dynamic service file that the service-file generator 235 can or has generated. As another example, the agent authorizer 305 can identify a requestor as an auditor and can determine that all auditors have access to all content objects except for those including variables contributing to response-request decisions. Thus, the agent authorizer 305 can determine that the requestor has access to any requested dynamic service file, but that part of each file will not be presented to the requestor. The agent authorizer 305 may further require and verify an agent-specific or general password.

In some instances, the agent authorizer 305 is integrated into the file request detector 230. For example, an unauthorized agent may not have the ability to even make a request for a dynamic service file 240.

The service-file generator 235 further includes a parameter detector 805 that identifies parameters of interest to be included in a generated dynamic service file 240. The parameters can include macro-parameters (each generated based on a set of chronicles) or micro-parameters (each pertaining to a specific chronicle. For example, a macro-parameter can include an average, an extreme, a median, a percentage of chronicles, etc. The parameters can be detected based on, e.g., regulations, internal policies, customer interests and/or user input.

For example, the parameter detector 805 can include a regulations engine that determines regulation-pertinent information based one or more regulations (e.g., Regulation C which implements the Home Mortgage Disclosure Act, the Equal Credit Opportunity Act, and the Community Reinvestment Act of 1977). The regulations engine can then identify regulation-pertinent types of summarization factors and/or requested types of factors to be summarized for the dynamic service file 240. For example, it may be important to statistically demonstrate that a requestor's ethnicity is not influencing loan approval rates. Thus, an independent parameter can be identified as "request response", a dependent parameter can be identified as "requestor's ethnicity", and a summarization variable can be a controlled p-value.

The parameter detector 805 can include a policy analyzer that interprets one or more internal and/or external policies to determine parameters of interest. For example, in a retail setting, the policy analyzer can determine that each of the following factors are of interest to an institution with regard to sales or potential sales associated with each salesperson: sales-completion percentage, profit margin, median time devoted per sale or potential sale, average number of add-on features sold, and client satisfaction. The policy analyzer can include a customizer, such as the customizer 315, such that a user can identify factors of interest via a webpage or application.

The parameter detector 805 can includes a customer-concern engine that characterizes actual or potential concerns. The concerns can be identified based on, e.g., market research (market-research surveys or market-research groups), customer satisfaction surveys, customer complaints and/or customer reviews. Relevant factors can include, e.g., price, quality of a service or product, wait time, whether a competitor offers a similar product or service at a better price, whether a competitor offers a better product or service (e.g., generally or for a similar price), and/or reliability.

The parameter detector 805 can determine that each factor is to be associated with a parameter. Alternatively or additionally, the parameter detector 805 may be able to determine a ranking or weighting for each factor. Thus, the parameter detector 805 can determine that a variable is to include a score equal to a weighted sum of the factors.

The service-file generator 235 includes an inter-chronicle summarizer 810 that generates one or more summary variables (e.g., a macro-parameter identified by the parameter detector 805). In some instances, a summary variable is generated by identifying a set of chronicles (e.g., associated with a specific entry for an information field, such as "Caucasian" for ethnicity) and summarizing a variable associated with each chronicle (e.g., determining an average approval rate for the set). In some instances, a summary variable is generated based on a statistical test, such as use of a logistic regression model, to determine whether a first parameter influences a second parameter. The summary variable can be generated while controlling for other parameters that may co-vary with a parameter of interest. For example, a requestor's ethnicity and income level may be statistically related. A statistical test or chronicle grouping can be devised to control for the co-variation. The inter-chronicle summarizer 235 can generate summary variables based on financial-service requests and/or existing financial services. For example, the inter-chronicle summarizer 235 can generate a first variable showing what factors significantly influence an approval decision and a second variable showing a demographic distribution of customers for existing loans. The summary variable can further be separately counted based on other parameters (e.g., separately calculated for each agent, branch, time period, or type of requested loan).

The service-file generator 235 includes a summarization level adapter 815, which can specify a degree to which data is summarized can be adjusted. At a high level, a large group of data can be summarized (e.g., to show an overall loan approval rate for a financial institution). At a lower level, subgroups of the data can be summarized (e.g., to show how the approval rate varies across branches, requestor's income brackets, or requestor's residential regions). Each successively lower level can further compartmentalize the data based on additional factors. At a lowest level, individual chronicles can be accessed. In some instances, one or more summarization levels are simultaneously presented within a dynamic service file 240. In some instances, an agent viewing a dynamic service file 240 can adjust a summarization-level input and the presented data can be automatically adjusted to correspond with the appropriate level.

The service-file generator 235 further includes a per-chronicle analyzer 820. The per-chronicle analyzer 820 can identify one or more specific chronicles that meet a criterion. For example, the identified chronicles can include: chronicles associated with outlier parameter values (e.g., all requests for which a requestor was Native American), a concerning request response (e.g., a rejected request or high interest rate despite a high salary and credit score; or a request in which an actual response differed from an automatically generated suggested response), concerning existing financial-service accounts (e.g., for which a threshold number of late payments have been received or no payments have been received for a threshold amount of time). The per-chronicle analyzer 820 can further or alternatively identify micro-parameter parameters. For example, the per-chronicle analyzer can identify an amount due and an overdue period for each chronicle with an outstanding balance due to a health-care institution and associated with a specific billing agent.

The service-file generator 235 further includes a bucket feed engine 825. The document feed engine 825 can identify a status of buckets associated with a single chronicle. For example, the bucket feed engine 825 can determine that, for a given chronicle, 8 specific buckets are filled and are complete, 4 specific buckets are filled but unfinalized, and 11 buckets are empty. The bucket feed engine 825 can further indicate whether buckets have undergone specific automatic or human-involved processing, such as review and approval by an internal agent. In some instances, the bucket feed engine 825 can further indicate statuses of non-bucket information associated with a chronicle. For example, the bucket feed engine 825 can indicate that 85% of an applicant's demographic information has been received or that specific information is missing. Thus, the bucket feed engine 825 can provide the capability of generating a dynamic service file characterizing one or more specific chronicles.

The service-file generator 235 also includes an institutional status monitor 830 that identifies financial, customer-satisfaction and/or regulatory statuses of an institution. For example, the institutional status monitor 830 can determine whether a financial institution's reserves are appropriate given an existing loan approval rate or outstanding total loan balance. As another example, the institutional status monitor 830 can determine whether a current and predicted inventory supply of a product is sufficient in view of a trend in sales of the product. The institutional status monitor 830 can further identify whether a summarization variable suggests that the institution is not in compliance with a regulation or policy and/or whether the institution is exhibiting a bias. The institutional status monitor 830 can further identify branches or agents that are associated with high or low performance (e.g., number of processed requests, profitability, non-bias, etc.).

Figure 9:
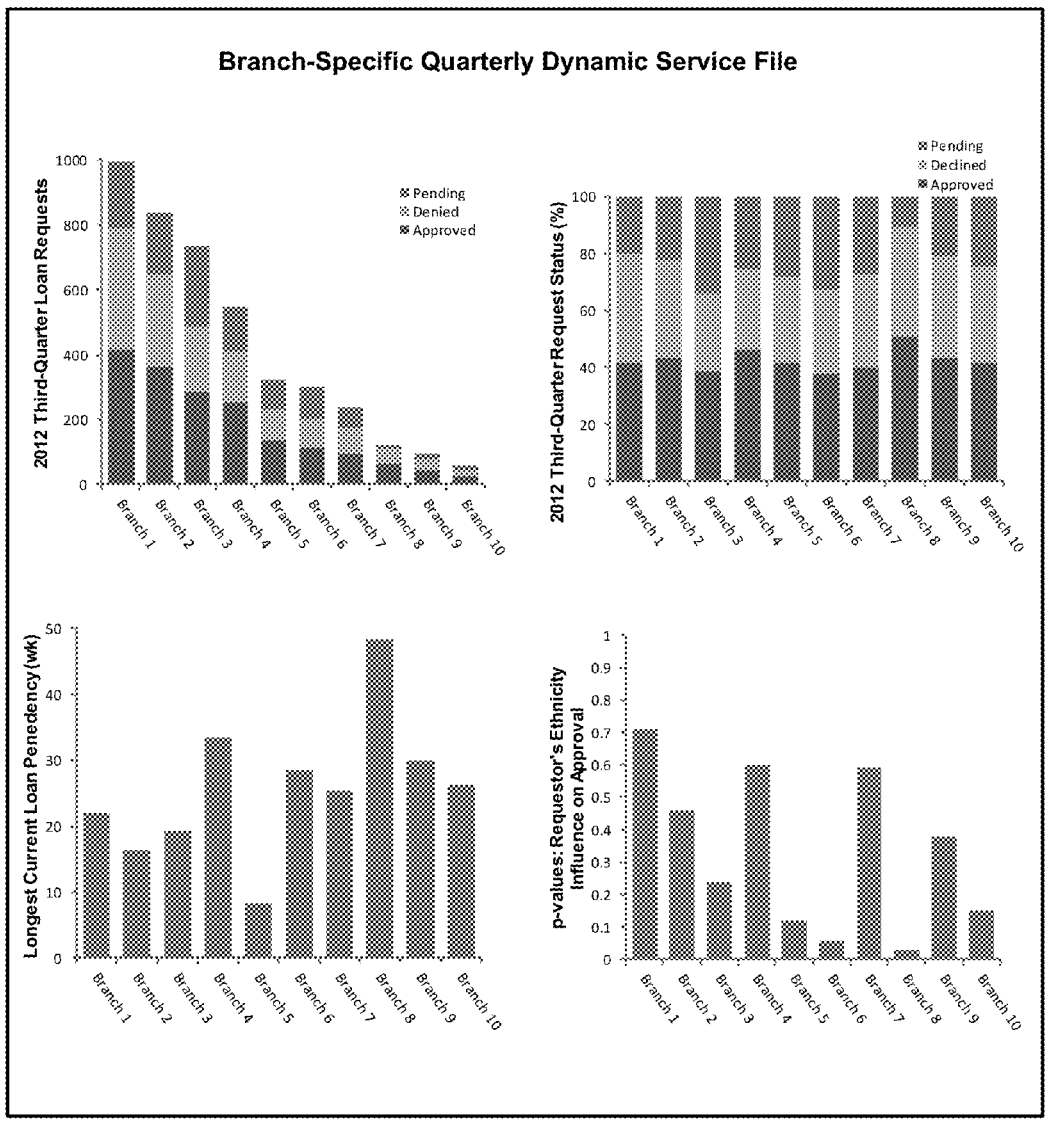
FIG. 9 illustrates an embodiment of a dynamic service file.

FIG. 9 shows an example of a dynamic service report 240 generated for a financial-service institution according to an embodiment of the invention. It will be appreciated that similar dynamic service reports 240 can be generated for other industries. The depicted dynamic service report 240 shows several branch-specific summarization variables. The top left plot shows a number of loan requests received during a third quarter in 2012 for each of ten branches of a hypothetical financial institution. Branch 1 received over ten times the number of requests as branches 9 and 10. Both top plots show the responses to the requests. The left plot shows the absolute responses, and the right plot shows the relative responses. The approval rate varied between 38-51%, the rejection rate varied between 27-39%, and the pending rate varied between 11-34%. Based on these graphs, a financial institution may be able to identify, e.g., branches not operating at maximum capacity and branches having a high or low number of pending loans. The financial institution could further investigate any branches that were associated with potentially concerning approval or rejection rates.

The bottom left plot shows a longest current loan pendency. Thus, even though branch #8 has a short overall percentage of relative "pending" loans, one of the pending loans is associated with the highest pendency periods across all branches. A financial institution could thus investigate long pendencies and either reward branches associated with short pendencies or attempt to route additional requests to these branches.

The bottom right plot shows p values characterizing whether a requestor's ethnicity influenced whether a loan request was approved or denied. For example, the p values may have been generated by constructing a logistic-regression model in which ethnicity was one of the independent variables and the request response was the dependent variable. Various agents may determine concerning p-values based on thresholds (e.g., set by regulators, government agencies or the financial institution) or by relative standards (e.g., always investigating the lowest p values). In this instance, branch 8 is associated with a 0.03 p-value, such that an agent viewing the dynamic service file 240 may wish to investigate this branch for potential discrimination.

The example shown in FIG. 9 shows a static dynamic service file 240. It will be appreciated that in some embodiments, the dynamic service file 240 can be manipulated by a user, such that summarization levels, segregation parameters, independent or dependent parameters, and/or summarization variable types can be adjusted and the appropriate data then presented.

Figure 10:
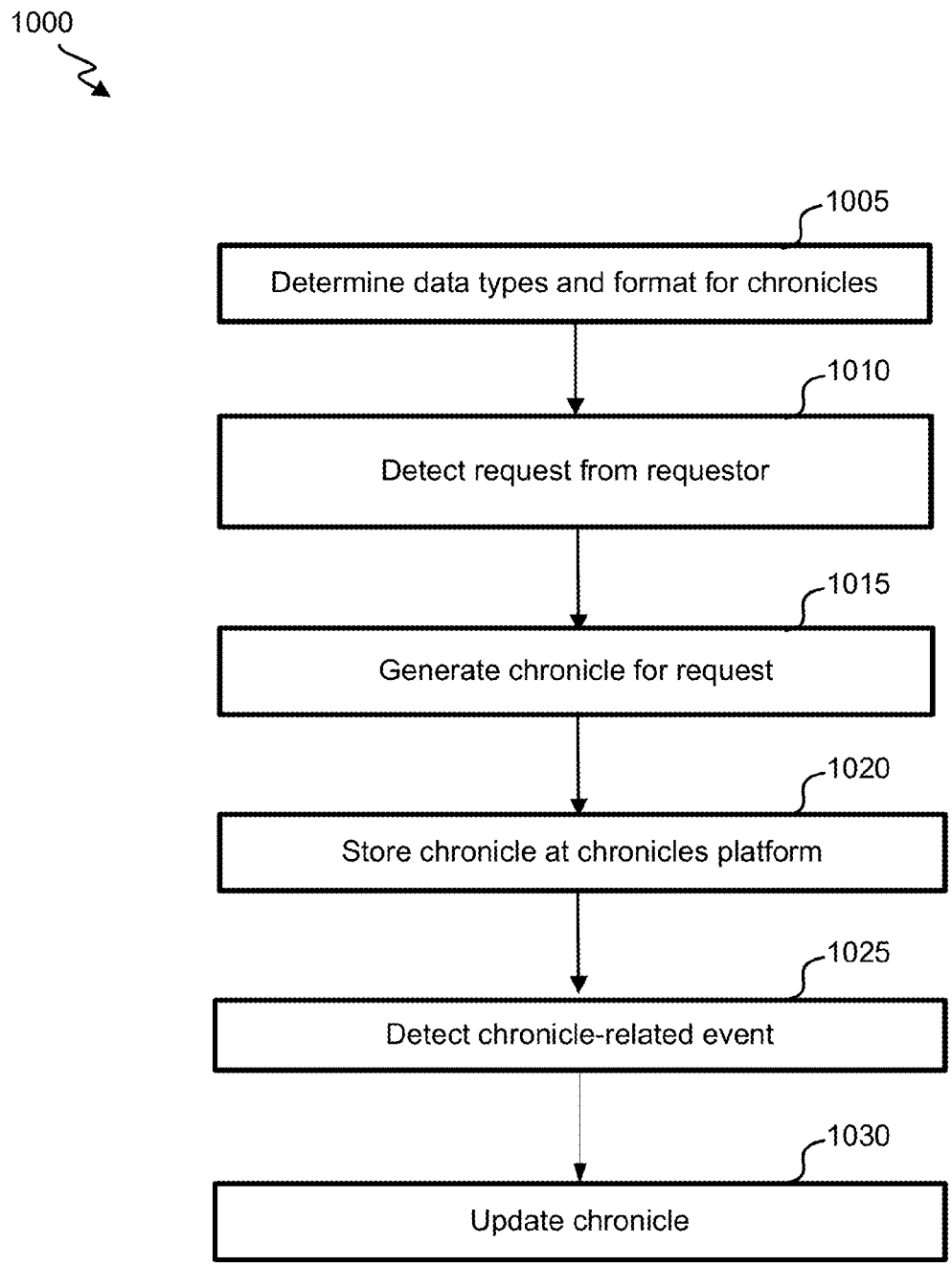
FIG. 10 illustrates a flowchart of an embodiment of a process for managing chronicles.

With reference to FIG. 10, a flowchart of an embodiment of a process 1000 for managing chronicles is shown. The depicted portion of the process 1000 begins in block 1005 where data types and format for chronicles is determined (e.g., by the chronicles generator engine 210). The data types and format can be determined based on existing regulations, previous requests or requirements from regulator agents 105c, priorities or initiatives internal to an institution, and/or ease in processing). A request made by or on behalf of a requestor is detected (e.g., by the service request intake engine 205) at block 1010. For example, the request can include a request for a loan made via a webpage, over the phone (while speaking to an internal agent), or while at a branch of a financial institution (while speaking to an internal agent or while interacting with an electronic device). As another example, the request can include a request to purchase a product made via a webpage.

A chronicle is generated for the request (e.g., by the chronicle generator engine 210) at block 1015. The generated chronicle can include the data types and format as determined in block 1005. The generated chronicle can include information and/or content objects available from the detected request 1010 and may further include an indication that some information and/or content objects are not yet available. The chronicle is stored at the chronicles platform 215 at block 1020.

A chronicle-related event is detected (e.g., by the event detector 225) at block 1025. The chronicle-related event can include, e.g., a newly uploaded document, new demographic information for the requestor, new qualification information for the requestor, and/or new information pertaining to the requested financial service. At block 1030, the detected chronicle-related event can be associated with a stored chronicle, and the chronicle can be updated to include the new information or document.

Figure 11:
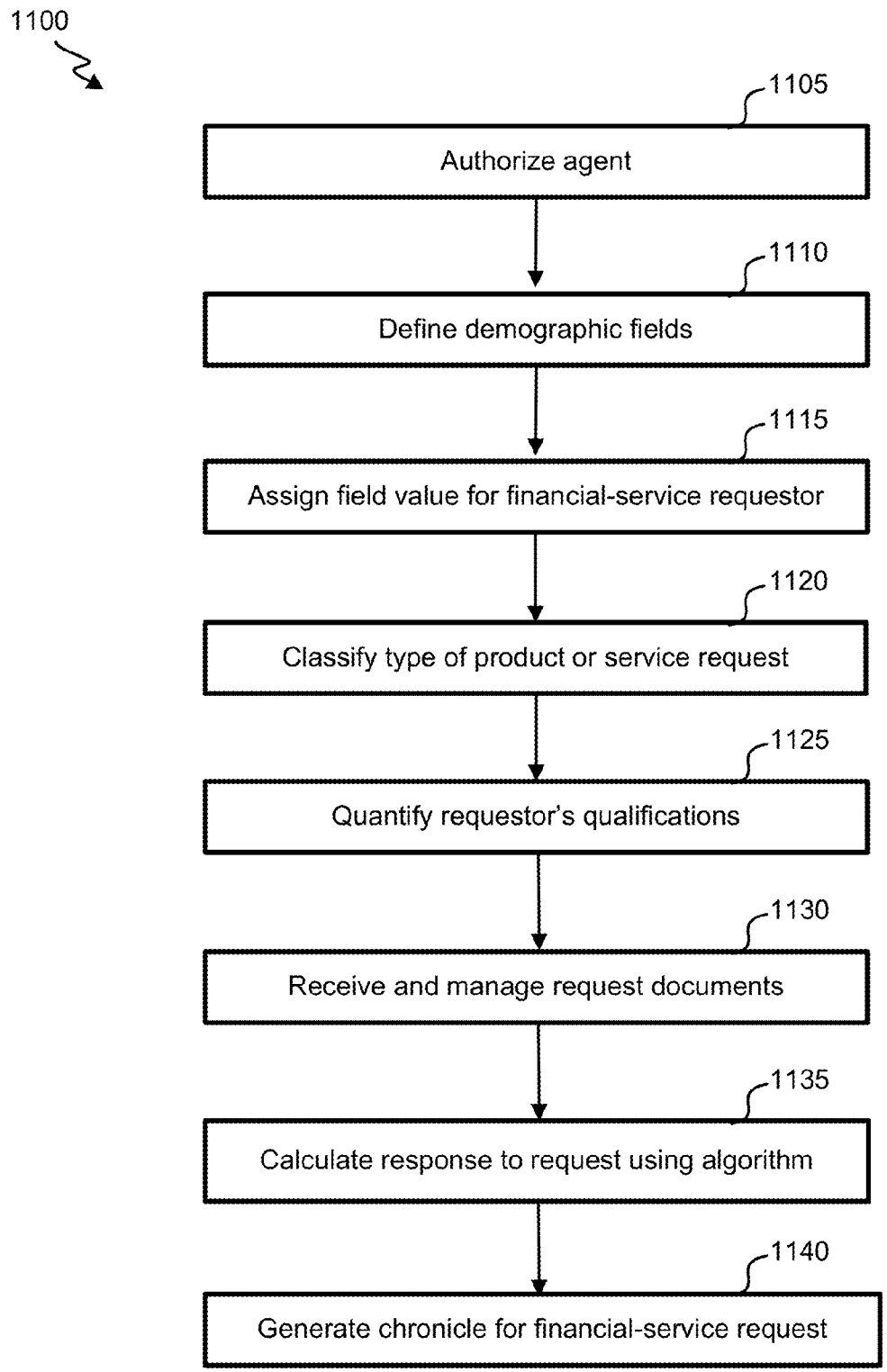
FIG. 11 illustrates a flowchart of an embodiment of a process for generating chronicles.

With reference to FIG. 11, a flowchart of an embodiment of a process 1100 for generating a chronicle is shown. The depicted portion of the process 1100 begins in block 1105 where an agent associated with a detected financial-service request is authorized to initiate the generation of the chronicle (e.g., by the agent authorizer 305). In some instances, all potential customer agents 105a can initiate the chronicle generation. In some instances, some or all employee agents 105b or 105c can initiate the chronicle generation.

One or more demographic fields are defined for the chronicle based on one or more regulations, policies and/or user input (e.g., determined by the data identifier 310 and chronicles formatter 320) at block 1110. For example, a demographic field can include "age" and can include a list of potential values (e.g., "18-24", "25-30", etc.). The demographic fields can include those which regulations require an institution within an industry to track and/or those for which discrimination is prohibited and/or those which an institution wishes to track (e.g., to help tailor future marketing efforts, product development, service offerings or contracts or to address concerns of existing or potential funders). Fields of interest to an institution can be determined based on policies and/or user input (e.g., received by the customizer 315). The requestor is assigned to a value for the defined one or more demographic fields (e.g., by the requestor characterizer 325) at block 1115. For example, a requestor could be assigned the following values: male, age 25-30, and Hispanic. The values can include numeric values, text values, and/or values selected from a list. The requestor can also be assigned values for other non-demographic fields (e.g., geographic regions) and/or values for other fields not defined based on the regulations.

The type of product or service requested is classified (e.g., by the request purpose assessor 330) at block 1120. For example, a requested service in the financial-service industry can be classified as: conventional mortgage, $200,000-$250,000, 30-year term, and fixed interest rate. As another example, a requested service in the education industry can be classified as: admission, full-time, undergraduate, education department, need-based scholarship, and school loans. As yet another example, a requested car product can be classified as: Ford, new, sedan, and $20,000-$30,000, payment plan. The requestor's qualifications are quantified (e.g., by the requestor qualification quantifier 335) at block 1125. For example, the requestor's monthly income and/or monthly amount due to other debts can be calculated and/or a qualification score can be calculated based on, e.g., credit scores, down-payment percentage, net worth, and/or income. As another example, a credit-card number provided by the requestor is verified.

One or more content objects are received and managed (e.g., by the content manager 340) at block 1130. The content objects can include, e.g., credit-score reports, tax documents, internal-review documents and/or standardized-test-score documents. A response to the request can be calculated using an algorithm (e.g., by the request response engine 345) at block 1135. In some instances, a score can be calculated. For example, in the financial-service industry a score can be calculated based on, e.g., a requested type of financial service (e.g., loan amount), expected income, credit score, net worth, down-payment percentage, and/or time at a future or existing employment. As another example, in the education industry, a score can be calculated based on, e.g., one or more standardized test scores, a grade-point average and other scores provided by references of the requestor. The score can then be compared to a threshold in order to determine whether the request should be approved, preliminarily approved or denied and any applicable terms (e.g., interest rate, scholarship offerings, loan offerings, finance availability and/or discounts).

A chronicle can be generated for the request (e.g., by the chronicles generator engine 210) at block 1140. The generated chronicle can include the field values assigned at block 1115, the classified request type determined at block 1120, the qualifications quantified at block 1125, the content objects received and managed at block 1130 and the response calculated at block 1135. In some instances, the generated chronicle can include at least some missing information and/or content objects.

Figure 12:
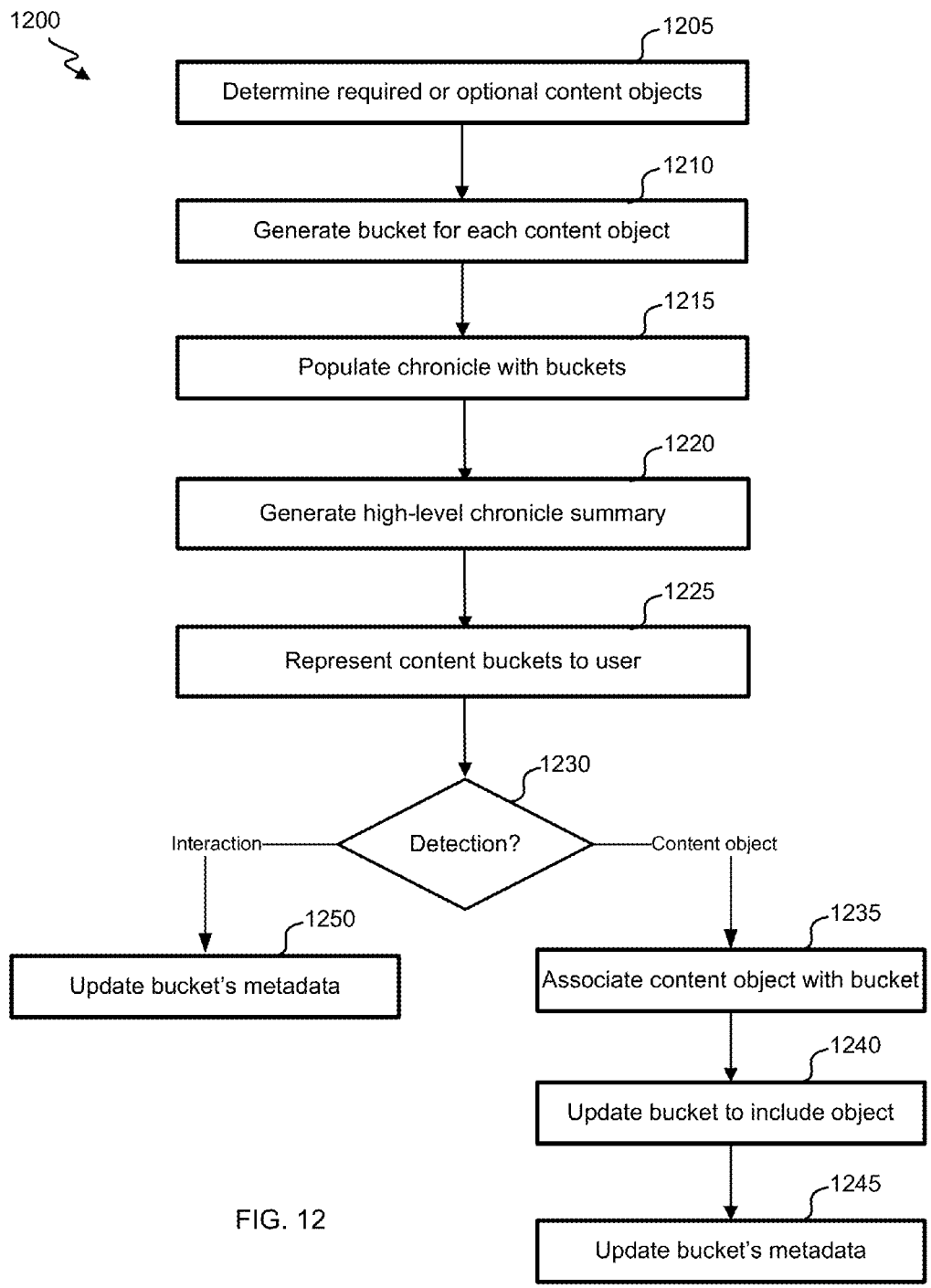
FIG. 12 illustrates a flowchart of an embodiment of a process for managing content objects.

With reference to FIG. 12, a flowchart of an embodiment of a process 1200 for managing content objects within a chronicle is shown. The depicted portion of the process 1120 begins in block 1205 where one or more required or optional content objects are determined (e.g., by content blank identifier 402). The content objects can be determined based on user input (e.g., received via customizer 315), a type of industry and/or a type of chronicle. Each type of industry and/or chronicle can be associated with required and/or optional content objects which can be determined, e.g., based on user input, policies, an analysis of applicable regulations and/or usage patterns. At block 1210, a bucket is generated for each content object (e.g., by bucket generator 406). One, more or each of the buckets can include a template content object which can be completed by a user or overwritten by a completed content object. The generated bucket can include metadata which can indicate, e.g., a name of the bucket, a name to be assigned to a content object that fills the bucket, a status of the bucket, a desired or required status of the bucket, users assigned tasks associated with the bucket, and/or interaction deadlines.

At block 1215, the chronicle is populated with the generated buckets (e.g., by chronicle bucket populator 414). At block 1220, a high-level chronicle summary is generated (e.g., by chronicle summarizer 432) that represents the buckets of a chronicle and may represent additional information about the buckets (e.g., their actual and required status).

At block 1225, a representation of the content buckets is presented to a user. For example, a list of content buckets within a folder associated with a chronicle can be presented or visual depictions of buckets with text overlapping or surrounding the buckets can be presented. In some instances, representations of at least some content buckets are only presented to a user, e.g., if the user is authorized to view the content bucket or if a chronicle is in a state in which it is desired or required that the user or another user interact with the bucket. Additional data can be simultaneous presented to the user or the additional data can be subsequently presented upon receipt of a user action (e.g., right clicking on a bucket and selecting an option). The additional data can indicate, e.g., a status of a bucket, a required or desired status for the bucket, user assignments, and/or deadlines.

At block 1230, an interaction or new content object is detected (e.g., by content detector 416 or user-interaction detector 430). If a new content object is detected, the process 1200 continues to block 1235 where the detected content object is associated with a bucket (e.g., by content-bucket associator 418). The association may be automatic or based on user input. At block 1240, the bucket is updated to include the content object (e.g., by bucket updator 420). In some instances, this includes establishing a mapping of the content bucket and associating the mapping with the bucket, renaming the content object, moving the content object, or replacing an old version of the content object with the content object. At block 1245, the bucket's metadata is updated (e.g., by bucket updator 420). The updated metadata can indicate that the bucket has been filled, a date and time on which the bucket was filled, a user that initiated the bucket fill, and/or a next desired or required action for the bucket (e.g., approval).

If an interaction with a bucket is detected at block 1230, the bucket's metadata is updated (e.g., by metadata updator 428) at block 1250. The updated metadata can indicate a type of interaction (e.g., view, editing, approval), a user performing the interaction, a date and time of the interaction, and/or a next required or desired action for the bucket.

Figure 13:
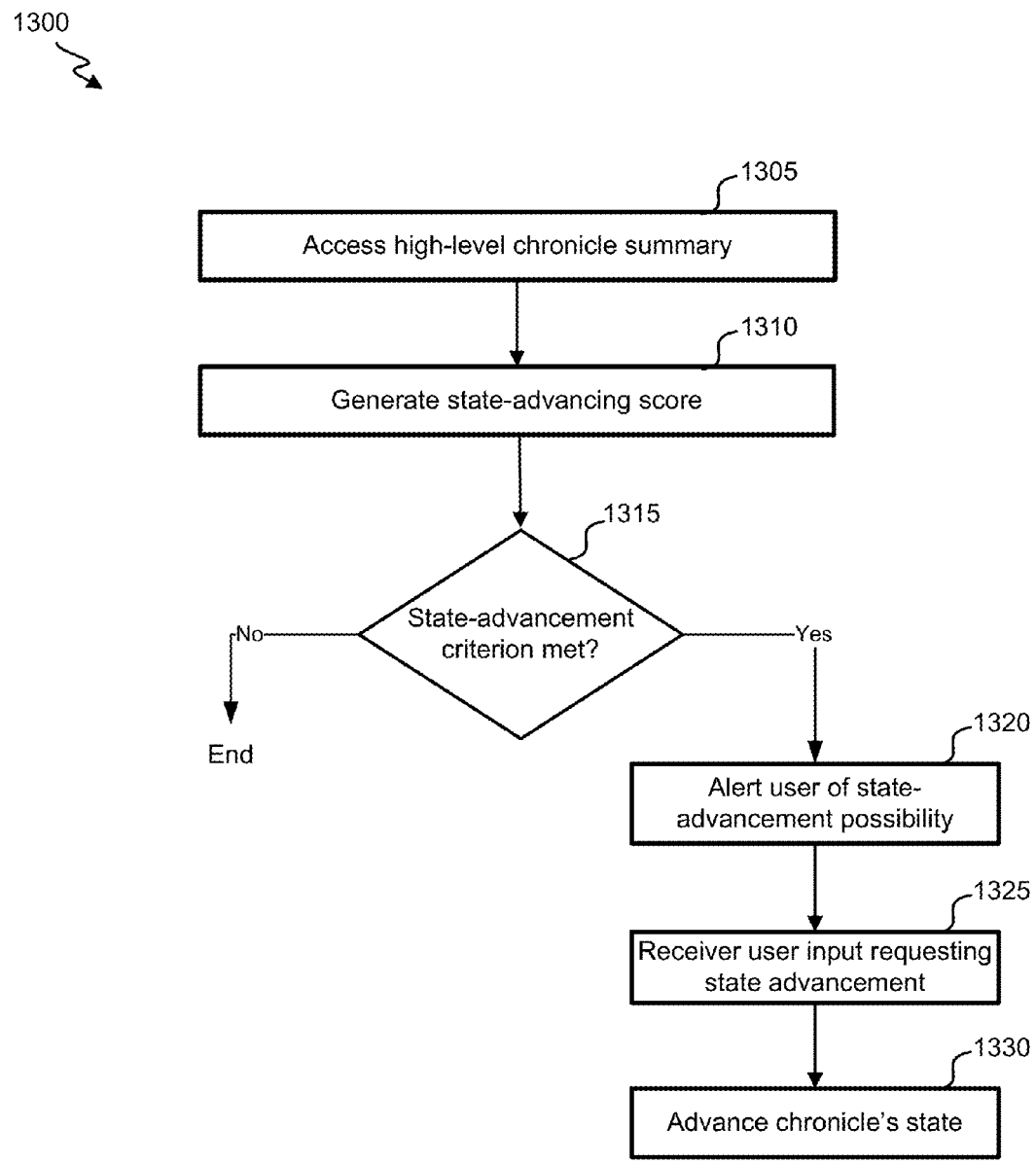
FIG. 13 illustrates a flowchart of an embodiment of a process for advancing a chronicle's state.

With reference to FIG. 13, a flowchart of an embodiment of a process 1300 for advancing a chronicle's state is shown. One, more or each state can be associated with a decision (e.g., pre-approval, determining an interest rate, or final approval). One, more or each state can be associated with a collection of different types of documents or data or collections of documents or data from different users (e.g., requesting documents and data from a potential customer in a first state, from third parties in a second state, and from internal agents in a third state). A set of possible states, state-advancement criteria, and/or any tasks required for each state can be defined by a user (e.g., via customizer 315).

Process 1300 begins at block 1305 where a high-level chronicle summary is accessed (e.g., by chronicle summarizer 432). The high-level chronicle summary can indicate statuses of buckets within the chronicle (e.g., indicating how many buckets of a given type are filled or approved). The high-level chronicle summary can further include other summary data, which may be extracted from content objects or obtained from user entries. Examples of such other data are provided in the chronicle overview shown in FIG. 6.

A state-advancing score is generated (e.g., by chronicle summarizer 432) at block 1310. The score can depend on bucket statuses. Further, the score can depend on a chronicle type or current state. For example, a first chronicle may be a loan-request chronicle in an entry state, and a second chronicle may be a savings-account chronicle in a maintenance state. "Filled" buckets may be important for the first chronicle to progress to a next state may be irrelevant to a determination as to whether the second chronicle advances states (e.g., instead relying on an amount within the account). Points contributing to the score can therefore be awarded accordingly.

At block 1315, it is determined whether a state-advancement criterion is met (e.g., by chronicle summarizer 432). This determination can include comparing each of one or more scores to one or more thresholds. In some instances, block 1310 is omitted from process 1300 and the determination is made without regard to a state-advancing score. Instead, the determination may be made based on an analysis of the statuses of individual buckets or groups of buckets.

If the criterion is met, a user is alerted of the state-advancement possibility (e.g., by state-advancement engine 440) at block 1320. The user can include a user authorized to authorize state advancements, such as an employee agent or an employee agent with supervisor authority. The alert can identify the chronicle and identify information about the chronicle (e.g., a current state, a potential next state, bucket statuses, and/or overview information). The alert can include, e.g., an email notification, a notification presented on an internal or external webpage, a text message or a voice message.

At block 1325, user input requesting state advancement is received (e.g., by state-advancement engine 440). For example, the user may log into his account, view the appropriate chronicle and select an option to advance the chronicle's state. Upon receiving the request, the chronicle's state is advanced (e.g., by state-advancement engine 440) at block 1330. Upon the state advance, new buckets can be generated and populated, new user assignments can be created, suggested or final decisions can be automatically determined (e.g., interest-rate calculations), and/or forms can be generated (e.g., approval forms).

Figure 14:
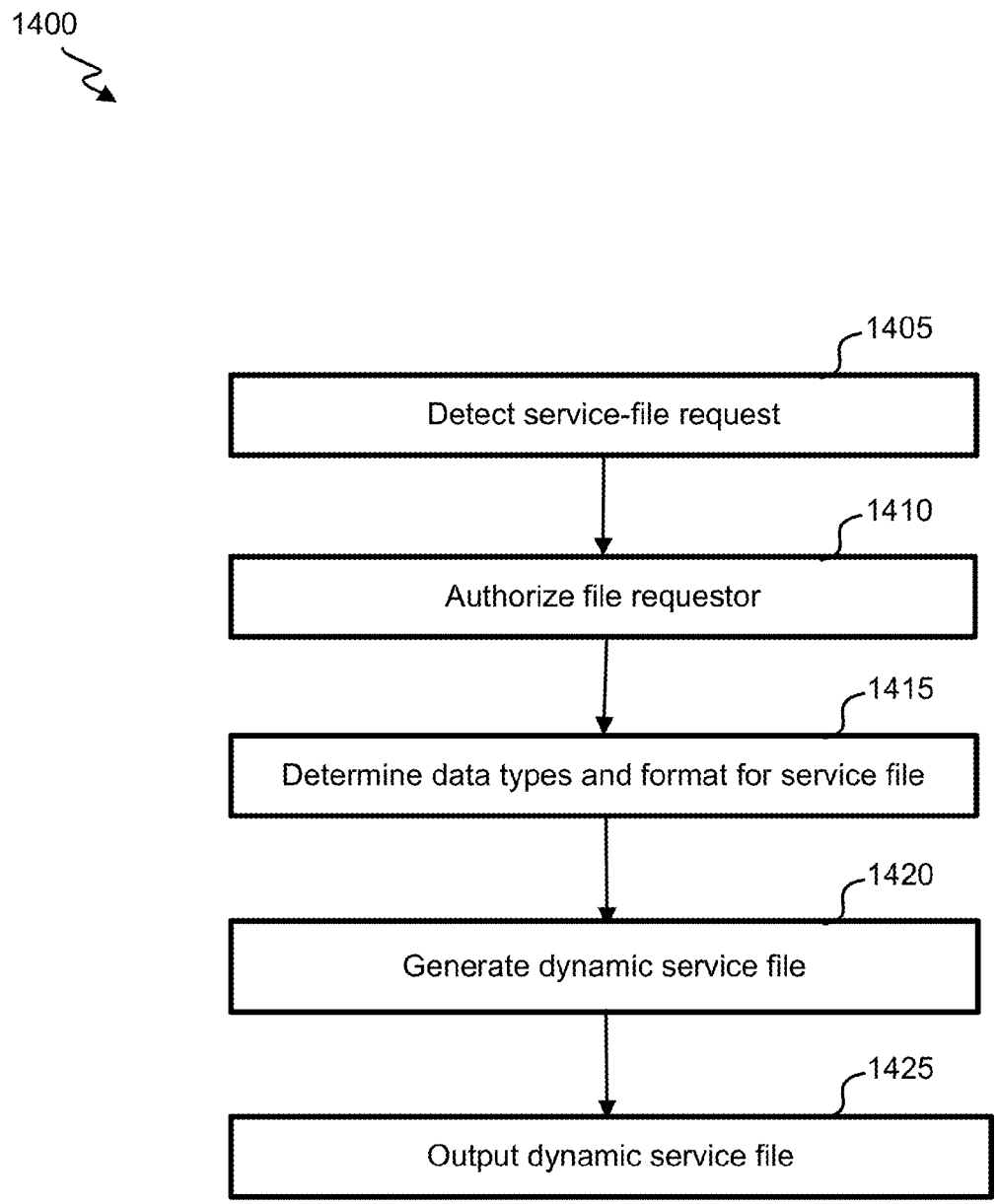
FIG. 14 illustrates a flowchart of an embodiment of a process for generating dynamic service files.

With reference to FIG. 14, a flowchart of an embodiment of a process 1400 for generating dynamic service files is shown. The depicted portion of the process 1400 begins in block 1405 where a service-file request is detected (by the file-request detector 230). The request may or may not include specific requests as to what is to be included in the dynamic service file (e.g., constraining values for specific parameters or whether specific parameters affect other parameters) and/or formatting of the dynamic service file. The service-file requestor is authorized (e.g., by the agent authorizer 305) at block 1410. For example, an agent registry can be consulted to determine whether a requestor has an authority to receive dynamic service files generally and/or to view specific types of information. The agent registry can be defined based on default settings (e.g., generally or tailored to a specific industry or institution) and/or user inputs (e.g., to customize the default settings).

Data types and/or formats for dynamic service files are determined (e.g., by the service-file generator 235 and/or parameter detector 805) at block 1415. The data types and/or formats can be determined, e.g., based on one or more of: applicable regulations, the service file requestor's authority to access information, policies (e.g., internal priorities or initiatives) and/or user input (e.g., received by customizer 315). A dynamic service file is generated (e.g., by the service-file generator 235) at block 1420 with the determined data types and format. The generated dynamic service file can include a hard-copy or electronic report or can be structured such that a viewer can interact with the file (e.g., adjusting a summarization level). The dynamic service file can be output (e.g., by the service-file generator 235) at block 1425. For example, the dynamic service file can be presented to the requestor via an interface (e.g., a webpage) or emailed to the requestor.

Figure 15:
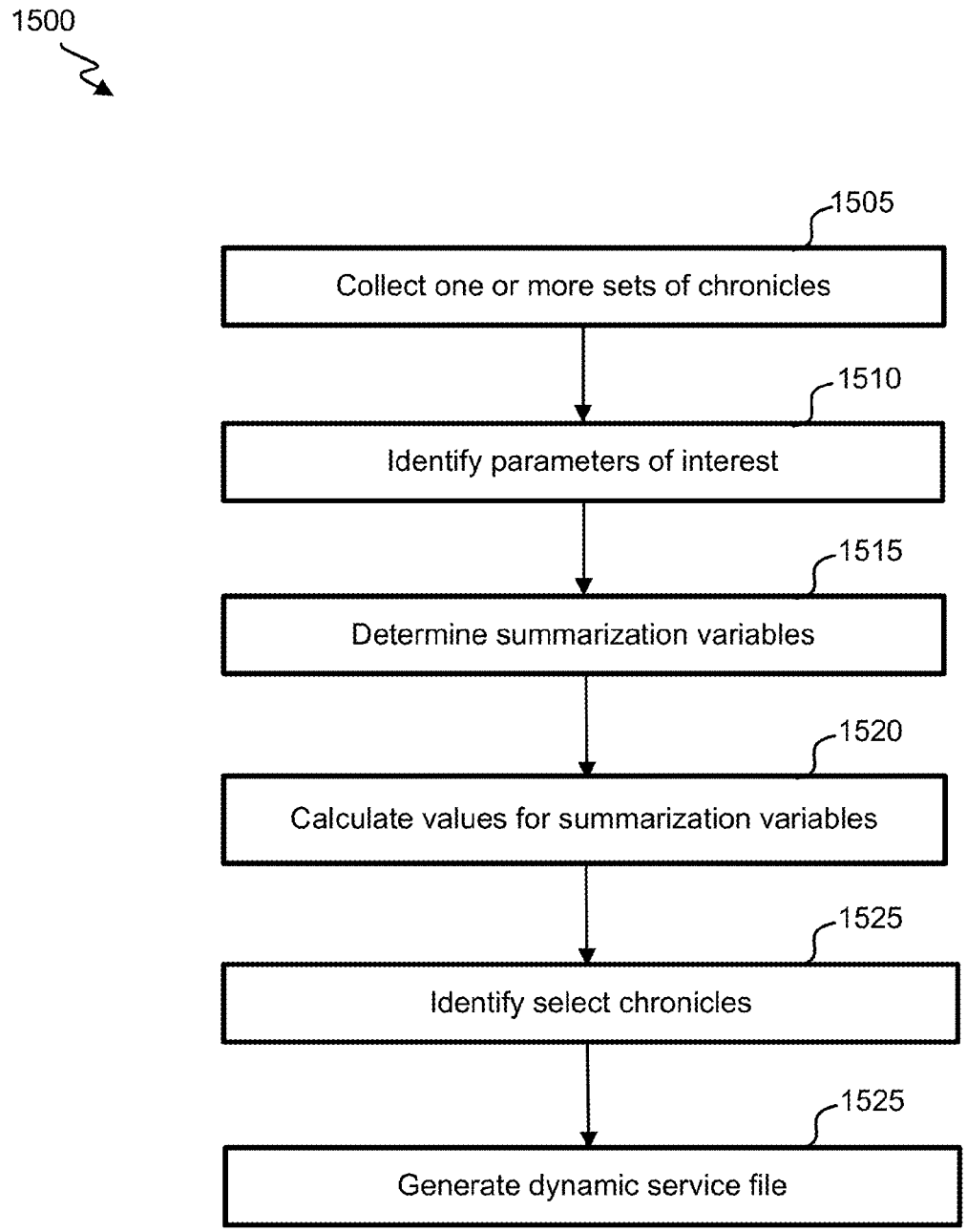
FIG. 15 illustrates a flowchart of an embodiment of a process for generating dynamic service files.

With reference to FIG. 15, a flowchart of an embodiment of a process 1500 for generating dynamic service files is shown. The depicted portion of the process 1500 begins in block 1505 where one or more sets of chronicles are collected (by the inter-chronicle summarizer 810). The one or more sets of chronicles can include, e.g., all requests received or disposed of within a time period, associated with an institution, associated with a branch, associated with an employee, and/or associated with a specific request type (e.g., requesting a specific type of service or product). One or more parameters of interest are identified (e.g., by parameter detector 805) at block 1510. The parameters can be identified by accessing and parsing regulations and/or policies. The parameters can be identified based on user input (e.g., received by the customizer 315). The parameters can include output variables (e.g., request responses, response pendency, interest rates, or a number of requests) or input variables (e.g., a requestor's ethnicity, a requestor's age, or a branch). One or more summarization variables are determined (by the inter-chronicle summarizer 810) at block 1515. The summarization variables can summarize one parameter across a set (e.g., identifying a total request number or average response pendency) or can indicate whether one parameter influences another parameter.

One or more values for the summarization variables are calculated (by the inter-chronicle summarizer 810) at block 1520. For example, a single numeric value, a range, or a distribution can be calculated. The summarization variable can be calculated based on an analysis of the one or more sets of chronicles. For example, in one instance, a summarization variable includes an approval rate, and the approval rate is separately calculated for multiple sets of chronicles, each set of chronicles being associated with a different branch of an institution, department, agent or type of agent. Calculating the one or more summarization variables can include, e.g., performing a statistical test.

One or more select chronicles are identified (e.g., by the per-chronicle analyzer 820) at block 1525. The select chronicles can include a random sampling amongst the set of chronicles, a random sampling amongst chronicles within the set of chronicles that met a criteria (e.g., being associated with an African American applicant), chronicles with unusual or concerning output parameters (e.g., unexpected request responses, long pendencies, low or high interest rates, etc.). A dynamic service file is generated (e.g., by the service-file generator 235) at block 1530. The dynamic service file can include the values for the summarization variables and can include information about (e.g., data from) the select chronicles.

Figure 16:
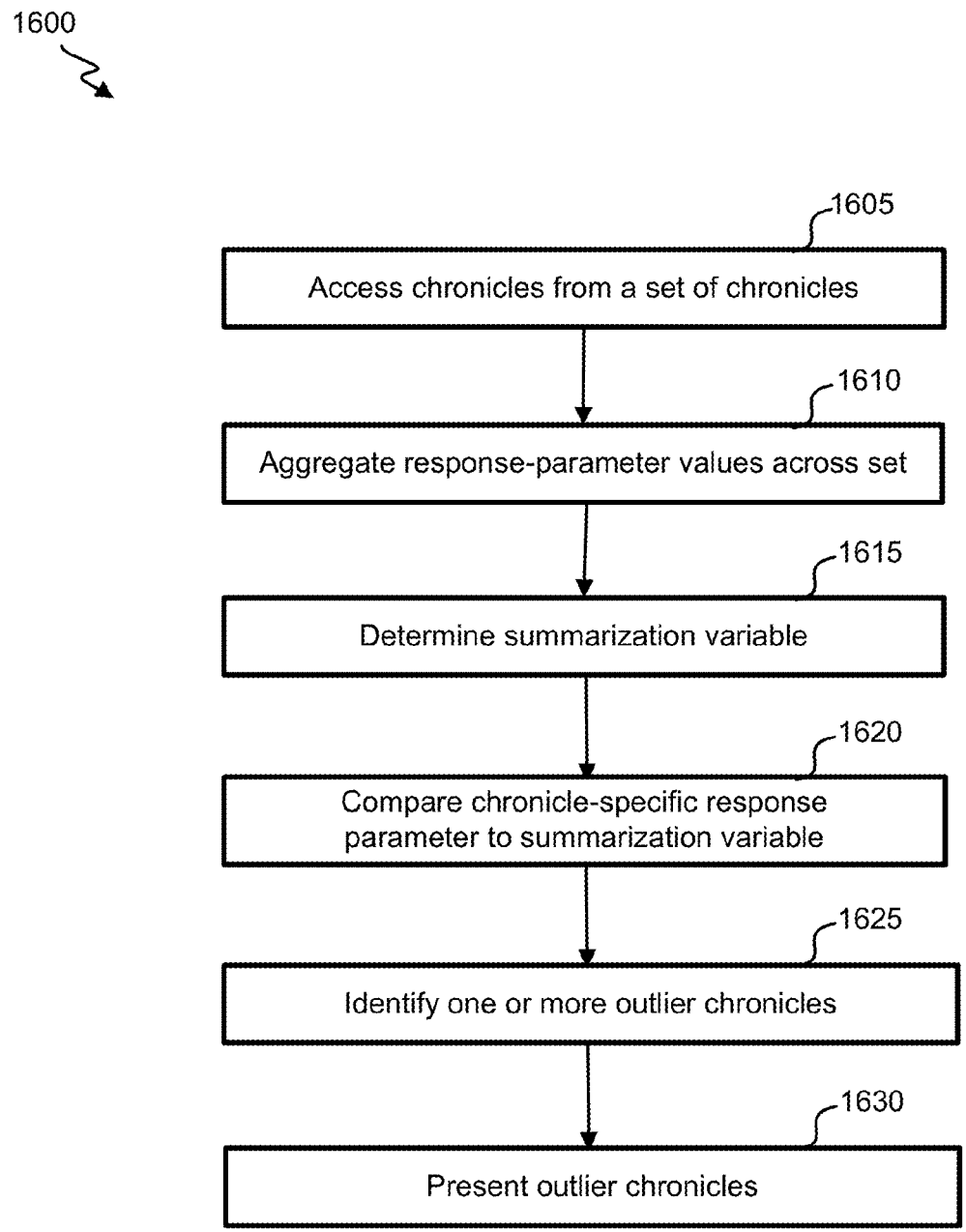
FIG. 16 illustrates a flowchart of an embodiment of a process for identifying outlier chronicles.

With reference to FIG. 16, a flowchart of an embodiment of a process 1600 for identifying outlier chronicles is shown. The depicted portion of the process 1600 begins in block 1605 where chronicles from a set of chronicles are accessed (e.g., by the inter-chronicle summarizer 810). Values for a response parameter are aggregated across the set (e.g., by the inter-chronicle summarizer 810) at block 1610. The response parameter can include, e.g., a request response, a pendency time period, an interest rate, a discount, an offered scholarship, an offered loan or financing, or an offered type of service. The aggregated values can include, e.g., a list of the values or a distribution of the values.

One or more summarization variables are determined (e.g., by the inter-chronicle summarizer 810) at block 1615. The summarization variable can include, e.g., an average, mean or range associated with the aggregated values. In some instances, the summarization variable represents coefficients or terms in an algorithm or model. For example, the summarization variable can include coefficients in an algorithm that indicates how an approval rate varies depending on an income of a financial-service requestor. In some instances, a plurality of summarization variables are determined. For example, a first average approval rate can be determined for a subset of the chronicles for which a financial-service requestor was "male" and a second average approval rate can be determined for a subset of the chronicles for which a financial-service request was "female".

Chronicle-specific response parameters are compared to the summarization variable (e.g., by the per-chronicle analyzer 820) at block 1620. For example, for each chronicle, it may be determined whether and/or to what degree a response-parameter value differed from an expected value based on the summarization variable. Specifically, in instances in which the summarization variable relates to an equation, an estimated response-parameter value can be predicted for each request and compared to an actual response-parameter value. As another example, for each chronicle, it may be determined whether and/or to what degree a response-parameter value differed from the summarization variable itself (e.g., a mean, range extreme or median).

One or more outlier chronicles can be identified (e.g., by the per-chronicle analyzer 820) at block 1625. The outlier chronicles can include chronicles for which the comparison at block 1620 was above a first threshold ad/or below a second threshold. For example, chronicles associated with response-parameter values that most largely differed from the summarization variable may be identified, or chronicles associated with response-parameter values that differed by more than a threshold amount from estimated response-parameter values (based on the summarization variable) can be identified. The outlier chronicles can thus be indicative of chronicles for which concerning, unfair or inconsistent responses were provided relative to other chronicles within the set.

The outlier chronicles can be presented (e.g., by the service-file generator 235) at block 1630. For example, an identification of the chronicles (e.g., a chronicle number or a financial-service requestor identifier) can be presented and/or information from the chronicle can itself be presented. In some instances, a dynamic service file is generated and includes data related to (or including) the summarization variable, the comparison and/or the identification of the outlier chronicles. The presentation can be made via an interface 110.

Figure 17:
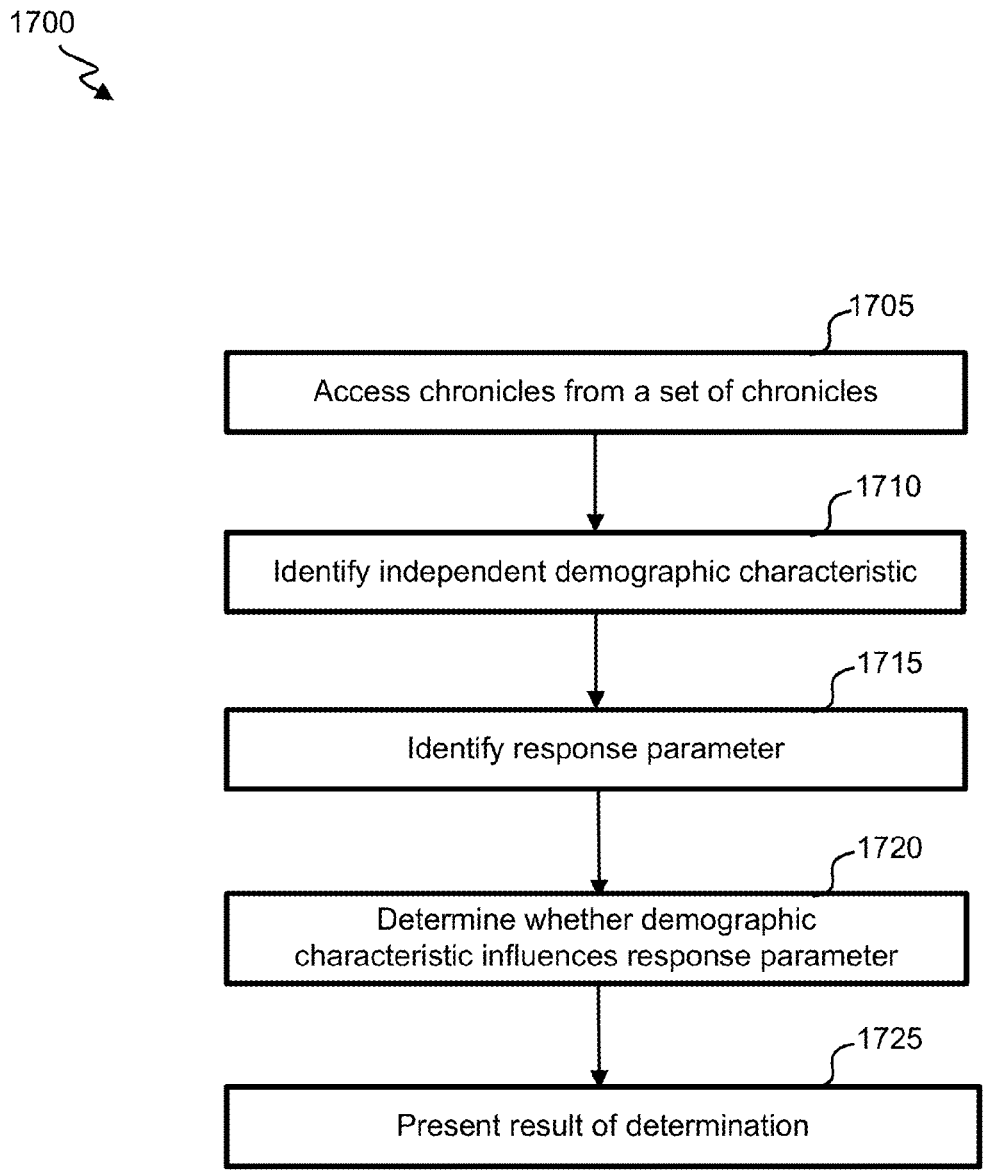
FIG. 17 illustrates a flowchart of an embodiment of a process for determining whether a characteristic influences a response parameter.

With reference to FIG. 17, a flowchart of an embodiment of a process 1700 for determining whether a characteristic influences a response parameter is shown. The depicted portion of the process 1700 begins in block 1705 where chronicles from a set of chronicles are accessed (e.g., by the inter-chronicle summarizer 810). An independent demographic characteristic is identified at block 1710. The independent demographic characteristic can include a demographic characteristic that may potentially influence request responses, that is prohibited via regulations to influence request responses, or that is internally prohibited to influence request responses. For example, the demographic characteristic can include an age, a sex, a race, a location or an income level.

A response parameter is identified at block 1715. The response parameter can include, e.g., a request response, a response pendency, an interest rate, a discount, an offered scholarship, an offered loan or financing, or an offered type of service. A determination is made as to whether the demographic characteristic influences the response parameter at block 1720. The determination can be based on a statistical test, on a statistical model, on p-values, and/or on group comparisons. In some instances, a t-test, ANOVA test, regression model, or logistic regression model is used in the determination. The determination can control for other characteristics that may also influence the response parameter (and/or may be correlated with the demographic characteristic).

The result of the determination is presented at block 1725. For example, one or more p values and/or coefficients can be presented. In some instances, a dynamic service file is generated and includes data related to (or including) the determination, a model or test used in the determination and/or a result of the determination. The presentation can be made via an interface 110.

Figure 18:
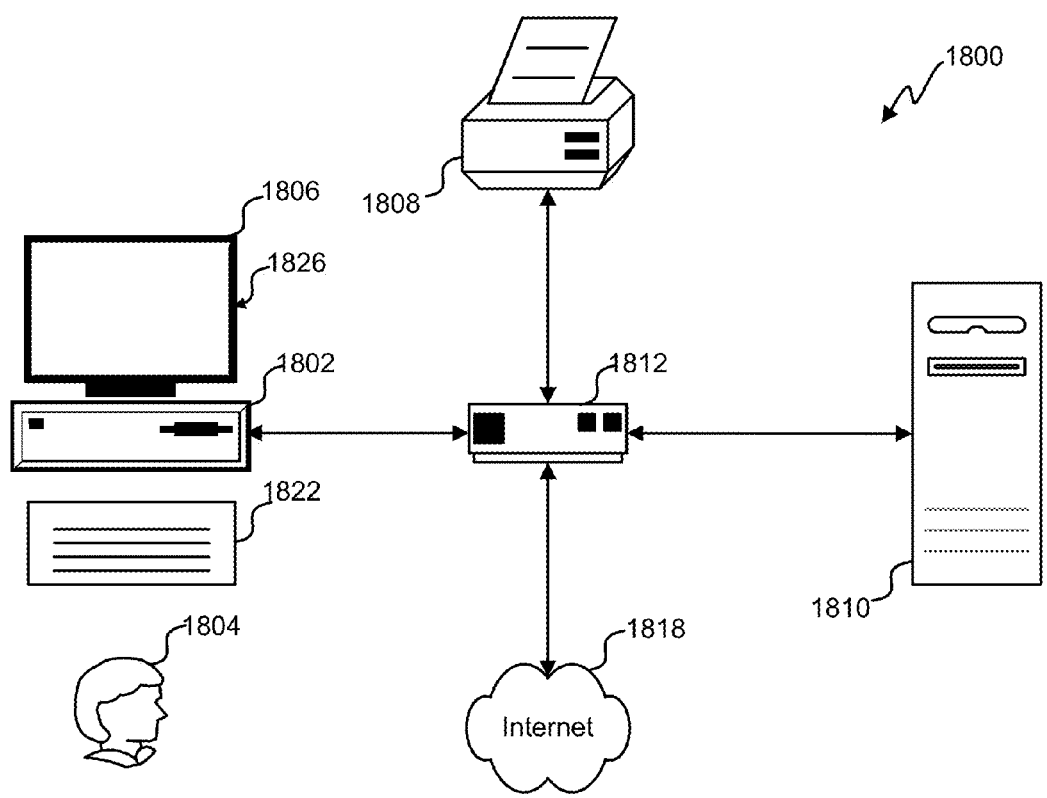
FIG. 18 depicts a block diagram of an embodiment of a computer system.

Referring next to FIG. 18, an exemplary environment with which embodiments may be implemented is shown with a computer system 1800 that can be used by a designer 1804 to design, for example, electronic designs. The computer system 1800 can include a computer 1802, keyboard 1822, a network router 1812, a printer 1808, and a monitor 1806. The monitor 1806, processor 1802 and keyboard 1822 are part of a computer system 1826, which can be a laptop computer, desktop computer, handheld computer, mainframe computer, etc. The monitor 1806 can be a CRT, flat screen, etc.

A designer 1804 can input commands into the computer 1802 using various input devices, such as a mouse, keyboard 1822, track ball, touch screen, etc. If the computer system 1800 comprises a mainframe, a designer 1804 can access the computer 1802 using, for example, a terminal or terminal interface. Additionally, the computer system 1826 may be connected to a printer 1808 and a server 1810 using a network router 1812, which may connect to the Internet 1818 or a WAN.

The server 1810 may, for example, be used to store additional software programs and data. In one embodiment, software implementing the systems and methods described herein can be stored on a storage medium in the server 1810. Thus, the software can be run from the storage medium in the server 1810. In another embodiment, software implementing the systems and methods described herein can be stored on a storage medium in the computer 1802. Thus, the software can be run from the storage medium in the computer system 1826. Therefore, in this embodiment, the software can be used whether or not computer 1802 is connected to network router 1812. Printer 1808 may be connected directly to computer 1802, in which case, the computer system 1826 can print whether or not it is connected to network router 1812.

Figure 19:
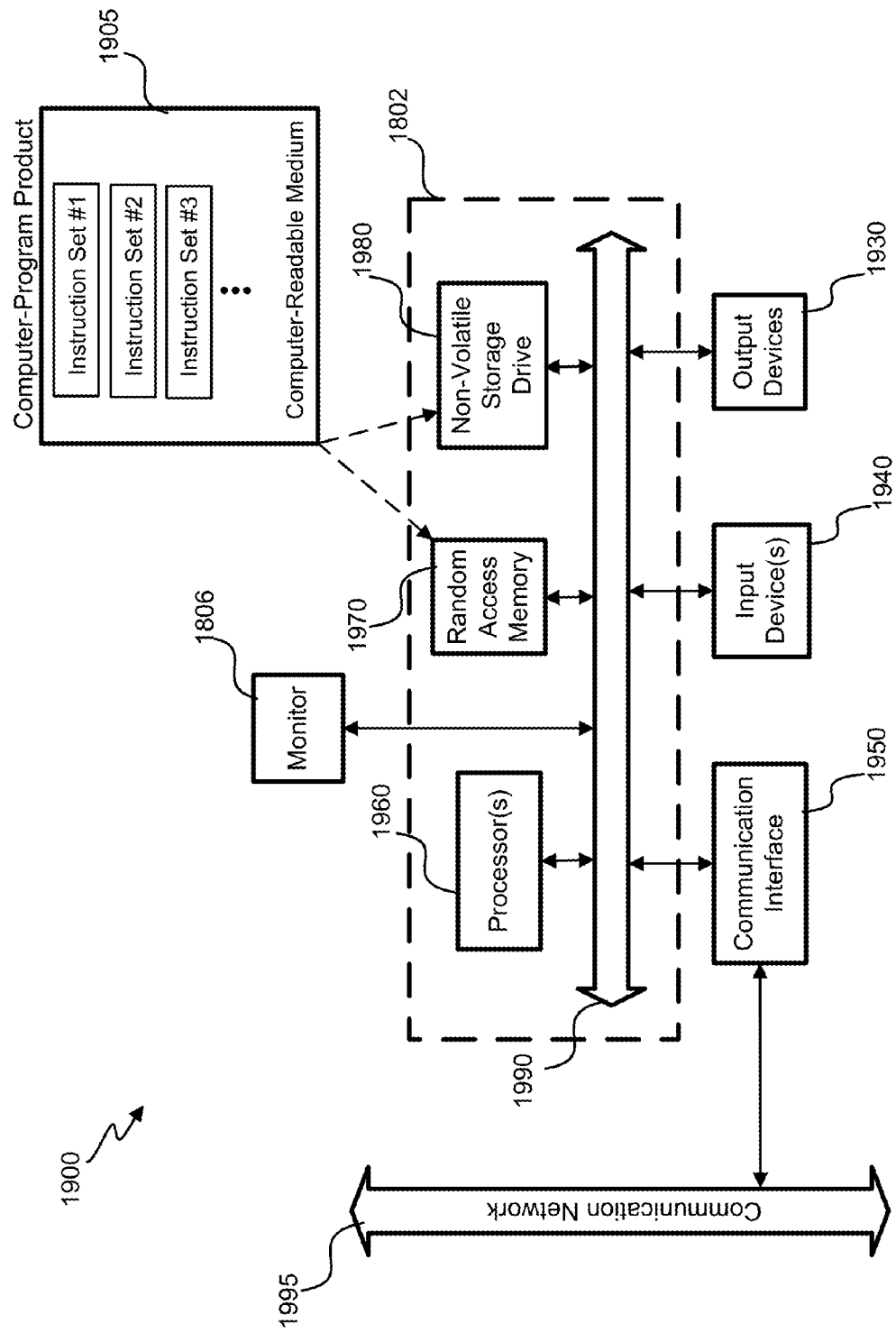
FIG. 19 depicts a block diagram of an embodiment of a special-purpose computer system.

With reference to FIG. 19, an embodiment of a special-purpose computer system 1900 is shown. Each component of each block diagram presented herein may be a special-purpose computer system 1900. For example, the chronicle engine 115, chronicles generator engine 210, content manager 340, event detector 220, and service-file generator 235 are examples of a special-purpose computer system 1900. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1826, it is transformed into the special-purpose computer system 1900.

Special-purpose computer system 1900 comprises a computer 1802, a monitor 1806 coupled to computer 1802, one or more additional user output devices 1930 (optional) coupled to computer 1802, one or more user input devices 1940 (e.g., keyboard, mouse, track ball, touch screen) coupled to computer 1802, an optional communications interface 1950 coupled to computer 1802, a computer-program product 1905 stored in a tangible computer-readable memory in computer 1802. Computer-program product 1905 directs system 1900 to perform the above-described methods. Computer 1802 may include one or more processors 1960 that communicate with a number of peripheral devices via a bus subsystem 1990. These peripheral devices may include user output device(s) 1930, user input device(s) 1940, communications interface 1950, and a storage subsystem, such as random access memory (RAM) 1970 and non-volatile storage drive 1980 (e.g., disk drive, optical drive, solid state drive), which are forms of tangible computer-readable memory.

Computer-program product 1905 may be stored in non-volatile storage drive 1980 or another computer-readable medium accessible to computer 1802 and loaded into memory 1970. Each processor 1960 may comprise a microprocessor, such as a microprocessor from Intel® or Advanced Micro Devices, Inc.®, or the like. To support computer-program product 1905, the computer 1802 runs an operating system that handles the communications of product 1905 with the above-noted components, as well as the communications between the above-noted components in support of the computer-program product 1905. Exemplary operating systems include Windows® or the like from Microsoft Corporation, Solaris® from Sun Microsystems, LINUX, UNIX, and the like.

User input devices 1940 include all possible types of devices and mechanisms to input information to computer system 1802. These may include a keyboard, a keypad, a mouse, a scanner, a digital drawing pad, a touch screen incorporated into the display, audio input devices such as voice recognition systems, microphones, and other types of input devices. In various embodiments, user input devices 1940 are typically embodied as a computer mouse, a trackball, a track pad, a joystick, wireless remote, a drawing tablet, a voice command system. User input devices 1940 typically allow a user to select objects, icons, text and the like that appear on the monitor 1806 via a command such as a click of a button or the like. User output devices 1930 include all possible types of devices and mechanisms to output information from computer 1802. These may include a display (e.g., monitor 1806), printers, non-visual displays such as audio output devices, etc.

Communications interface 1950 provides an interface to other communication networks and devices and may serve as an interface to receive data from and transmit data to other systems, WANs and/or the Internet 1818. Embodiments of communications interface 1950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1950 may be coupled to a computer network, to a FireWire® bus, or the like. In other embodiments, communications interface 1950 may be physically integrated on the motherboard of computer 1802, and/or may be a software program, or the like.

RAM 1970 and non-volatile storage drive 1980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1970 and non-volatile storage drive 1980 may be configured to store the basic programming and data constructs that provide the functionality of various embodiments of the present invention, as described above.

Software instruction sets that provide the functionality of the present invention may be stored in RAM 1970 and non-volatile storage drive 1980. These instruction sets or code may be executed by the processor(s) 1960. RAM 1970 and non-volatile storage drive 1980 may also provide a repository to store data and data structures used in accordance with the present invention. RAM 1970 and non-volatile storage drive 1980 may include a number of memories including a main random access memory (RAM) to store of instructions and data during program execution and a read-only memory (ROM) in which fixed instructions are stored. RAM 1970 and non-volatile storage drive 1980 may include a file storage subsystem providing persistent (non-volatile) storage of program and/or data files. RAM 1970 and non-volatile storage drive 1980 may also include removable storage systems, such as removable flash memory.

Bus subsystem 1990 provides a mechanism to allow the various components and subsystems of computer 1802 communicate with each other as intended. Although bus subsystem 1990 is shown schematically as a single bus, alternative embodiments of the bus subsystem may utilize multiple busses or communication paths within the computer 1802.

Thus, embodiments disclosed herein can assist agents associated with financial services in organizing and understanding financial-service data. For example, a chronicle can be generated for a loan request. Data and/or documents can be collected, and the chronicle can be accordingly updated. Internal agents can interact with the data and/or documents. Upon satisfaction of specific criterion, the chronicle can advance to a next stage of a loan-approval process. Within each stage, different data and/or documents can be required, and different agents can be required to interact with the chronicle. Further, dynamic service files can be produced to summarize real-time statuses and information pertaining to one or more chronicles.

EXAMPLES

Example 1

A financial institution uses chronicle engine 115. The financial institution includes a set of branches and an online interface through which customers or potential customers can communicate with the institution or agents of the institution.

A high-level officer initially logs into the chronicle engine 115 and customizes the chronicle engine 115. The customization is performed using a customizer which receives input and presents data using a web-based or application-based interface. The officer defines a set of chronicle types to be: non-mortgage loans, mortgages and checking accounts. He defines a set of states for each chronicle to be: requesting state, request-decision state, denied state, and approved state. He further defines a criterion which must be met in order for a chronicle to advance states (i.e., a criterion for transitions between: the requesting state and the request-decision state, the request-decision state and the denied state, and the request-decision state and the approved state). A criterion for transition between the requesting state and the request-decision state depends on whether specific information and/or content objects have been received, and the other transitions depend on receipt of a final decision by a specific type of agent. He further defines types of agents and authorities of each type of agent.

With regard to the chronicles generator engine 210, the officer identifies types of data to be collected. Specifically, he indicates that for each requestor, the following fields must be completed: name, social security number, age, address, telephone number, estimated annual income. For a mortgage or non-mortgage loan request, the requestor must also identify a requested loan amount and an amount in one or more checking accounts, savings accounts and/or investments. For a mortgage request, the requestor must further identify a property address and a sales amount. Optional fields include a co-signor's name, social security number and estimated income; an email address, a requested loan term, and a requested type of interest rate. The officer can indicate this information is to be entered into a set of identified forms (of which, blank versions can be uploaded by the officer). Further, the officer indicates that three credit-report content objects (from specific agencies) must be received for all requests and that an appraisal content object must be received for mortgage requests. The officer indicates types of agents that are responsible for collecting the required information and the types of agents that are responsible for entering the required information into the forms, for collecting the non-form content objects and for reviewing and approving the form and non-form content objects. Specifically, for loans and mortgages, a loan officer is to collect the information and the content objects, and a supervisory loan officer is to review and approve the content objects and also to determine whether requests are ultimately approved or declined.

Upon detection of a request by the request intake engine 205, the request purpose assessor 330 determines that the type of request is a loan request and the content manager 340 begins generating buckets. A first bucket is generated to include a form uploaded by the officer, which includes fields to input the required and optional data for the loan request. Three additional empty buckets are generated for the credit-report objects. Based on the officer's input, the user assigner 410 generates metadata indicating which type of users is responsible for completing the form, which type of user is responsible for collecting the credit-report objects, and which type of user is responsible for approving each content object. A storage space is then populated with the buckets.

A loan officer logs into the chronicle generator 115. The loan officer can view the generated buckets. He accesses the form bucket and enters in appropriate information. Further the loan officer uploads three documents. When he attempts to save the documents to the chronicle, a name for each bucket in the chronicle is shown. For each object, he identifies the object as a credit report by selecting an associated name during the saving process. The status of the bucket is then changed from empty to filled. The loan officer cannot approve the content objects, because he lacks such authority. Subsequently, a supervisory loan officer logs into the chronicle generator 115. She can view the buckets and can see (from a status of the bucket) that each bucket is waiting for approval. She selects each bucket, and data in the bucket is presented. She subsequently approves the bucket. The score assessor 438 is meanwhile repeatedly updating a state-advancing score. Upon the approval of the required buckets, the score passes a threshold, and the state-advancement engine 440 alerts the supervisory loan officer that the chronicle is ready for state advancement. She indicates that the request is to be approved, and the chronicle's state is subsequently advanced accordingly by the state-advancement engine.

Example 2

A university uses chronicle engine 115. A head of an admission office customizes the chronicle engine 115. She indicates that a chronicle is to be associated with each student or potential student (e.g., each student requesting admission). She identifies chronicle requirements, which can vary depending on whether the student is applying for admission or is a current student, an education level (e.g., whether the student is applying for admission as a graduate student or an undergraduate student) and a department (e.g., whether a student is majoring in chemistry or music). For students requesting admission, the chronicle must include the student's name, address, race, sex, attended schools, grade point average, standardized test score(s), and names and emails of three references. Three reference-letter content objects are identified as being required and an additional two are identified as being optional. Other required content objects (e.g., summarizing past academic accomplishments, past community-service efforts or career goals) can depend on a department to which the student is requesting admission. The admission-office head can identify states and state-advancing criteria, which may be similar to those from Example 1. In this instance, she indicates that a chronicle can automatically advance from the request-decision state to the denied state upon generation of a score (based on parameters, such as a grade point average and standardized test score) that is below a threshold, and that a chronicle is to be advanced from the request-decision state to the approved state upon generation of a score above a threshold and approval by two admission-committee agents.

A chronicle is then generated as each admission request is initiated. A first bucket can include a form which can be populated based on information entered by a student via a website. Additional empty buckets can be initially empty and ready to accept documents uploaded by students responsive to department-specific essay questions. After a student uploads each document, the content manager 340 can check that it is of an acceptable type, present a list of essay questions and then ask the student to identify which essay question contents of the document are responsive to. The content-bucket associator 418 can associate the document with an appropriate content bucket based on the identification. The bucket updator 420 can then rename the document to have a standardized name and update metadata to reflect a date and time of upload. A person serving as a reference can also access the content manager and can identify a chronicle using the student's name. The reference can have restricted ability to modify the content. The reference can be asked to identify himself as one of a list of previously student-identified references. The reference can then upload his reference letter, and the content-bucket associator 418 can associate the document with an appropriate content bucket based on the identification. The bucket updator 420 can rename the document (e.g., as "RefLtr1") based on who the reference is or how many reference letters were previously uploaded for the chronicle.

The chronicle summarizer 432 can determine when the chronicle has the required content and can generate a state-advancing score. The score depends on a grade point average and on a standardized test score, such that if either of these values are below a respective preliminary threshold, the score is also below a threshold. If the state-advancing score is below the threshold, the chronicle is automatically advanced to a denied state, and a rejection letter is generated and sent (e.g., mailed or emailed) to the requestor. If the state-advancing score is at or above the threshold, the chronicle is advanced to a request-decision state. Two admission-committee agents are notified of the advancement. The agents can then access the chronicle and review the documents. Before the chronicle can further advance its state, both agents must be required to view each content object and submit a recommendation whether to approve or deny the admission. The recommendation can include a mere binary indication or a numeric value indicating how strongly the agent feels as to whether the student should be admitted. Upon receipt of the recommendations, a final decision can be determined based on one or both of the recommendations and/or based on recommendations from other chronicles. The chronicle is then advanced to an approved or denied state and a letter indicating the state is generated and sent to the student. Finally, in order to be fully accepted, the student may need to confirm intent to attend the university. Upon receipt of the intent, the chronicle can be advanced into a current-student state.

Example 3

The U.S. Fish and Wildlife Service permits uses chronicle engine 115. A director of the agency customizes the chronicle engine 115. He indicates that a chronicle is to be associated with each requested or issued permit. Permits can include incidental take permits, enhancement of survival permits and recovery and interstate commerce permits.

He identifies chronicle requirements, which vary depending on a type of requested permit. For all permits, chronicle requirements include a name and address of a requesting entity, whether the entity had previously been issued the same permit, a requested permit date range, and which species the permit would pertain to. For incidental take permits, he indicates that a chronicle must include a habitat-conservation-plan content object. For enhancement of survival permits, he indicates that a chronicle must include a Safe-Harbor-Agreement content object or Candidate-Conservation-Agreement-with-Assurances content object. For recovery permits, he indicates that the chronicle must include a research-plan content object, and a conservation-plan content object must be included for an interstate commerce permit.

He indicates types of agents that are responsible for collecting the required information and the types of agents that are responsible for entering the required information into the forms, for collecting the non-form content objects and for reviewing and approving the form and non-form content objects. He identifies chronicle states and state-advancing criteria, which may be similar to those from Example 1. In this instance, a criterion indicates that a chronicle is to advance from a requesting to a request-decision state upon entry of all required information, uploading of all required documents and an affirmative submission by a requestor. An internal reviewing agent can then be required to review the chronicle and determine how the chronicle should next advance.

A chronicle is then generated as each request is received. A first bucket can include a form which can be populated based on information entered by a requestor via a website. The form can indicate which type of permit is being requested, and one or more additional empty buckets can be generated to correspond to appropriate requested content objects. After a requestor uploads each document, the content manager 340 can check that it is of an acceptable type and may ask the requestor to identify the object (e.g., by presenting a list of content objects if more than one can or must be uploaded). Upon receiving a response, the content-bucket associator 418 can associate the document with an appropriate content bucket based on the identification. The bucket updator 420 can then rename the document to have a standardized name and update metadata to reflect a date and time of upload.

The chronicle summarizer 432 can detect when the chronicle has the required content, and the state-advancement engine can alert an internal agent that the chronicle is ready for an approval decision. An internal agent then logs into chronicle engine 115 and access and view the chronicle. At this time, the chronicle has been updated (by the bucket generator 406 and the chronicle bucket populator 414) to include a bucket, which includes a decision form. The agent accesses the form and inputs an approval decision along with reasons for the decision. The completed form is then automatically sent to the requestor.

Example 4

A hospital uses chronicle engine 115. An officer of the hospital customizes the chronicle engine 115. She indicates that a chronicle is to be associated with each patient.

She identifies chronicle requirements as including the patient's name, address, social security number, phone number, insurance provider, allergies, current medications, medical history and surgical history. If the patient is insured, other requirements include an insurance member identifier and a phone number for the insurance provider. She identifies optional fields as a primary-care physician, a referring physician and a name and phone number of an emergency contact. She identifies a list of potential content objects including pre-approval documents and laboratory-test-result documents. She further indicates that internal agents can save other content objects to a chronicle even if it was not associated with a type that she defined.

She indicates types of agents that are responsible for collecting the required information and the types of agents that are responsible for entering the required information into the forms, for collecting the non-form content objects and for reviewing and approving the form and non-form content objects. She identifies chronicle states as: potential patient, admitted patient or past patient. She indicates that a chronicle is to automatically change states upon entry of information from an internal agent as to whether a patient has been or is admitted to the hospital.

A chronicle is then generated as each pre-admission form or admission form is received. These forms can be completed by hand by patients and then electronically entered to chronicle engine 115 by an internal agent. In instances in which a patient cannot complete the form by hand, an internal agent can enter as much information as possible electronically to cause the chronicle to be generated. In this instance, a chronicle need not advance through all states. For example, if a patient is rushed to the hospital by an ambulance, a chronicle can immediately be entered into the admitted patient state. In the potential patient state, the chronicle can attempt to gather contact and billing information. An internal medical agent (e.g., a nurse or doctor) can, at any time, review a chronicle and change its state (thereby admitting or discharging the patient). In the admitted patient state, internal medical agents can upload medical-notes, medical-test or laboratory-report documents. Because of the uncertainty as to which types of documents will be required, buckets may not be pre-generated or pre-populated. However, the content-bucket associator 418 may, at the time of upload, ask the uploading agent to identify the type of document and can thereafter generate a name (e.g., "MedicalNotesFromDc-trGS" or "BloodTestOct152012") with a consistent naming structure. Even if the patient is then seen by different doctors or departments, information and content objects of interest then remain available to medical entities.

Once the patient has been discharged, the bucket generator 406 and chronicle bucket populator 414 generate billing buckets and content objects. The content objects in these buckets are automatically completed based on existing information about the patient's insurance and medical treatment. The state-advancement engine 440 notifies an internal billing agent of the chronicle and requests approval of the content objects. The internal billing agent logs into the chronicle engine 115 and approves, postpones or modifies (and then approves or postpones) the content objects. Upon approval, a bill is automatically generated and sent to an insurance company or to the patient and another bucket is generated with an empty form with fields for a date and amount of payment. Upon payment of the bill, the bucket is updated accordingly. Upon having received no response or an insufficient response, a reminder bill is sent.

Example 5

A fracking company uses chronicle engine 115. A vice president of the company customizes the chronicle engine 115. He indicates that a chronicle is to be associated with each received complaint.

He identifies chronicle requirements, which include a name, address and phone number of the person issuing the complaint, a date range associated with the complaint and a location or address associated with the complaint. He indicates that a chronicle can include any number of image content objects pertaining to the complaint, which can be uploaded by the person issuing the complaint or an internal agent. He indicates that a chronicle is to include an optional investigation form, which identifies dates and actions taken to assess the validity and/or severity of the complaint and a required response form, which identifies dates and actions taken to respond to the complaint.

He indicates types of agents that are responsible for collecting the required information and the types of agents that are responsible for entering the required information into the forms, for collecting the non-form content objects and for reviewing and approving the form and non-form content objects. He identifies chronicle states as: pending complaint, investigation, response determination and completed. He indicates that a chronicle is to advance from: the pending complaint state to the investigation state once all the required information has been gathered: the investigation state to the response determination state once an internal agent has indicated that an investigation is complete or unnecessary, the response determination state to the final state once a response approach has been determined and a response document has been generated and sent to the person who issued the complaint.

A chronicle is then generated as each complaint is received. The complaint can be received electronically using a web-based form or can be received after an agent electronically enters information from a written or telephonic complaint. The information received can be used to complete fields in a content object in a form bucket. Further, if the complaint included any images, the images can be uploaded to the chronicle and named using a naming convention (e.g., "ComplaintImage1"). Once the required information is present, the chronicle can automatically advance from the pending-complaint state to the investigation state, and the state-advancement engine 440 can alert an investigatory agent of the state change. The alert can also identify substance of the complaint, a region including the location or address associated with the complaint, fracking wells that may be affecting that region, and dates and results of past investigations investigating the region. Further, a new bucket and content object are generated with fields indicating whether an investigation is to be performed; if so, details of the investigation; and if not, reasons for not performing it (e.g., a recent similar investigation was performed).

The investigatory agent then logs into the chronicle engine 115, accesses the new investigation bucket and indicates that an investigation is to be performed. He continues to update the content object to identify a date of the investigation and results of the investigation. Investigation-related documents (e.g., signal images or pictures) can also be uploaded and named using a naming convention. The internal agent thereafter indicates, in the content object of the investigation bucket, that the investigation is complete and selects a final opinion: no merit, moderate concern or high concern. Upon detection of the final opinion, the state-advancement engine 440 advances the chronicle to the response determination state. If the final opinion is "no merit" a form letter is generated and sent to the person issuing the complaint and the state is again advanced to completed. Otherwise, the state-advancement engine 440 notifies an officer of the company of the state change. And a new bucket is generated including a substantively blank letter to the person issuing the complaint and a substantively blank form to a government agency. The officer then logs into the chronicle engine 115, reviews the information included therein, and modifies one or both of the blank letter or blank form. Thus, the officer decides whether the complaint should be reported to a government agency. The officer then modifies a field in the initial form bucket to indicate that the response is complete, and the state-advancement engine 440 then accordingly advances the chronicle's state.

Example 6

A hotel uses chronicle engine 115. A manager of the hotel customizes the chronicle engine 115. She indicates that a chronicle is to be associated with each requested or existing reservation.

She identifies chronicle requirements, which can vary depending on whether the chronicle is associated with a requested reservation or existing reservation. For any chronicle, she indicates that the chronicle must include the requestor's or customer's name, address, and phone number and requested or actual reservation dates. Optional information includes a frequent-visitor number, a discount code and additional preferences. For existing-reservation chronicles, she indicates that the chronicle must include the customer's credit card number and a room number.

She indicates types of agents that are responsible for collecting the required information and the types of agents that are responsible for entering the required information into the forms, for collecting the non-form content objects and for reviewing and approving the form and non-form content objects. She identifies chronicle states as: requested reservation or existing reservation. She indicates that a chronicle is to automatically change states from requested reservation to existing reservation upon entry of all required information and entry of a valid credit card number.

A chronicle is then generated as each request is received. Specifically, a chronicle is generated after receiving an inquiry about occupancy availability via a website, phone or in person. A web inquiry can be used to automatically complete fields in a form content object in a reservation bucket, or the fields can be completed by an agent receiving the information from the requestor over the phone or in person. Once the required information is received, available room options are determined and presented (e.g., to a requestor or agent completing the form). A room option is selected and payment information is entered. Upon confirming the validity of the payment information, the chronicle advances to the existing-reservation state. The form in the reservation bucket is then updated to include a room number and an access code to the room, both of which are sent (e.g., electronically) to the requestor.

The requestor arrives at the hotel on the date of his reservation, He need not check in with the front desk and may go straight to his room. Upon entry of the access code, the door is unlocked and the form in the reservation bucket is updated to include the arrival time. The requestor subsequently orders room service. A room-service agent completes a standard form identifying the time, contents and price of the order and uploads the form to the chronicle. The document is automatically recognized as a room-service document. A bucket is generated, the document fills the document, the document is named according to a naming convention (e.g., "RoomService1") and the status of the document is set to "filled".

After the reservation time period, a billing bucket and content object is generated and saved to the chronicle. The content object is automatically filled to include the price of the room and the room service. A credit card on file is billed and a receipt (e.g., the content object) is electronically sent to the requestor.

Example 7

A retail chain that sells computers uses chronicle engine 115. An officer of the chain customizes the chronicle engine 115. He indicates that a chronicle is to be associated with each requested or actual purchase.

He identifies chronicle requirements, which vary depending on a type of product at issue. For all chronicles, chronicle requirements include a name and address of an actual or potential purchaser, a proposed or actual payment method (e.g., cash, credit card or payment plan), an identifier of the product, a sales price and whether any add-ons (e.g., warranties or accessories) are to be or were included in the purchase. He defines a list of available add-ons for each type of product. He indicates that a disclaimer content object is to be included in each chronicle.

He indicates types of agents that are responsible for collecting the required information and the types of agents that are responsible for entering the required information into the forms, for collecting the non-form content objects and for reviewing and approving the form and non-form content objects. He identifies chronicle states as: purchase request and actual purchase. He indicates that a chronicle is to advance from the purchase request state to the actual purchase state once all the required information has been gathered and upon the potential purchaser agreeing to an offered payment plan or providing other valid payment (e.g., a valid credit card number or cash).

A chronicle is then generated as each purchase request is received. A first bucket includes a form which can be populated based on information provided to a salesperson, such as the requestor's name, the requestor's address, a product identifier and a preferred payment method. A second bucket includes a list of available add-ons or accessories. Upon entry of the product identifier, a subset of the add-ons or accessories are emphasized. The salesperson accesses the second bucket and informs the requestor of the emphasized add-ons or accessories. He modifies the list to indicate whether the requestor would like to purchase each add-on or accessory. If the preferred payment method is a payment plan, a third bucket is generated which includes a payment-plan form. The salesperson then inputs the requestor's social security number in the form. A credit check is automatically performed, and the payment-plan form is updated to include n offered payment plan. The salesperson identifies the offered payment plan to the requestor and updates the form to indicate whether the requestor accepted or rejected the plan. A fourth bucket (generated upon entry of the product identifier) includes a document with text of a disclaimer. The salesperson reads the disclaimer to the requestor, and the requestor initials a small electronic device indicating acceptance of terms in the disclaimer. In this sequence of events, the salesperson is consistently alerted as to which bucket he should access/complete next based on a highlighting of a representation of the bucket on an interface.

Upon completion of the required fields in the form of the first bucket, completion of acceptance or refusal of the emphasized add-ons or accessories of the second bucket, an acceptance of a payment plan or entry of another valid payment method, and acceptance of the disclaimer, the chronicle is advanced to the actual purchase state. The salesperson is then instructed to receive payment from the requestor if necessary (e.g., if not on a payment plan). A fifth bucket is generated which includes a receipt and a sixth bucket is generated which includes a return policy. The salesperson prints the receipt and policy and gives them to the requestor along with the product. A seventh bucket is also generated to include a blank return form, which can be completed if the requestor later returns the product.

Example 8

An advertisement-placement company uses chronicle engine 115. A supervisor of the company customizes the chronicle engine 115. She indicates that a chronicle is to be associated with each advertisement and with each content item (e.g., webpage, movie, or television show) accepting of an advertisement.

She identifies chronicle requirements as including a name of an entity providing the advertisement or content item, a date range of applicability (when the content item will be presented and/or when a provider of an advertisement would like for the advertisement to be presented), duration of an advertisement or acceptable advertisement, and a format of an advertisement or acceptable advertisement (e.g., image, text, animation or audio-visual file). She identifies optional fields as a requested or acceptable price range, a desired or offered placement location of an advertisement, and duration of a content item or acceptable content item. She indicates that the content item itself can be included in a content-item chronicle and an advertisement in an advertisement chronicle. A content-item chronicle must include a category of the content item and may include one or more requested or prohibited categories of an advertisement. An advertisement chronicle must include a category of the advertisement and may include one or more requested or prohibited categories of a content item.

She indicates types of agents that are responsible for collecting the required information and the types of agents that are responsible for entering the required information into the forms, for collecting the non-form content objects and for reviewing and approving the form and non-form content objects. She identifies chronicle states as: unplaced advertisement, partially placed advertisement, fully placed advertisement, unfilled content item, partially filled content item and filled content item. She indicates that a chronicle is to advance from an unplaced/unfilled state to a partially placed/partially filled state upon an acceptance by an associated client to have an associated advertisement placed in at least one content item or to have an at least one advertisement placed in an associated content item. She further indicates that chronicle is to again advance states once agreements for a desired number of placements have been made.

An advertisement chronicle is then generated as each request is received for placement of an advertisement in a content item. An advertisement-client bucket is generated and includes an advertisement-client form which can be populated with fields based on information (e.g., name, phone number, website and/or billing information) about an entity providing the advertisement. The entity providing the advertisement provides values for the fields using an online form, and the advertisement-client form is immediately and automatically updated to include the values. An advertisement-data bucket is generated and includes a form with for fields based on characteristics of the advertisement and preferences in terms of how the advertisement is to be placed (e.g., a type of content file, a category of content file, an unpreferred category of conte tilfe, an estimated number of views per placement, a duration of placement, a cost plan (e.g., pay-per-click, pay-per-view or pay-per-associated-purchase—which may be accompanied by cost ranges per click, view or purchase), a spatial or temporal placement window, and/or a desired spatial size or temporal window for the advertisement). The entity providing the advertisement provides values for the fields using the same online form, and the advertisement-data form is immediately and automatically updated to include the values. The entity providing the advertisement then uploads the electronic advertisement itself. When attempting to save the advertisement, the user is presented with content-object-type options and identifies it as the advertisement. A new chronicle bucket is generated and is filled with the advertisement. The object is automatically named based on a naming convention (e.g., "Client1Ad3Image").

A content-item chronicle is then generated as each preliminary offer is received to accept one or more advertisements to be placed in a content item. A content-item-client bucket is generated and includes an content-item-client form which can be populated with fields based on information (e.g., name, phone number, website and/or billing information) about an entity providing the content item. The entity providing the content item provides values for the fields using an online form, and the content-item-client form is immediately and automatically updated to include the values. A content-item-data bucket can include a form with for fields based on characteristics of the content item (e.g., a type of content item, an estimated number of views per time period, a category of the content item (e.g., comedy movie, drama movie, comedy TV show, etc.), and/or an estimated number of available presentations of the content item) and preferences in terms of how the advertisements can be placed in the content item (e.g., a types of acceptable/unacceptable advertisements, categories of acceptable/unacceptable advertisements, an acceptable advertisement duration or size, and/or a cost plan). The entity providing the content item provides values for the fields using the same online form, and the content-item-data form is immediately and automatically updated to include the values. The entity providing the content item then uploads the electronic content item itself. When attempting to save the content item, the user is presented with content-object-type options and identifies it as the content item. A new chronicle bucket is generated and is filled with the content item. The object is automatically named based on a naming convention (e.g., "Client5File2Website").

For each chronicle, the chronicle summarizer 432 detects when the chronicle has the required content. For advertisement chronicles, a score is then generated for each available content-item chronicle to determine a strength of a match between the chronicles. For content-item chronicles, similar scores are generated for each available advertisement chronicle. If there exists at least one pair of corresponding advertisement-chronicle and content-item-chronicle scores that are above respective thresholds, one or more placements are selected. The number of placements per chronicle depends on the number of above-threshold score pairs and preferences regarding number of placements. The placements can include those associated with top score pairs or randomly selected amongst above-threshold score pairs.

If the number of placements is such that all desired placements for an advertisement have been assigned, an advertisement chronicle is advanced to a fully-placed-advertisement state. The chronicle is then updated to include an advertisement-presentation bucket which includes a content object that tracks and presents actual presentations, clicks on and associated purchases for the advertisement. Data from the advertisement-presentation bucket is used to calculate an amount due, and an invoice bucket filled with an invoice reflecting the amount due and amount automatically collected using provided payment information is generated. If the number of placements is such that all desired placements for an advertisement have been assigned, an advertisement chronicle is advanced to a partially-placed-advertisement state. In this state, advertisement-presentation and invoice buckets are generated as well, but the state differs from the fully-placed-advertisement state, as the chronicle summarizer 432 continues to generate scores for new content item chronicles and determine whether further placements are to be assigned.

If the number of placements is such that all preliminary offers to accept advertisements to be placed in a content item have been accepted, a content-item chronicle is advanced to a fully-filled-content-item state. The chronicle is then updated to include an advertisement-presentation bucket which includes a content object that tracks and presents actual presentations, clicks on and associated purchases for each particular matched advertisement. Data from the advertisement-presentation bucket is used to calculate an amount due, and an invoice bucket filled with an invoice reflecting the amount owed and amount automatically collected from an advertisement-associated entity. If the number of placements is such that all preliminary offers to accept advertisements to be placed in a content item have not been accepted, a content-item chronicle is advanced to a partially-filled-content-item state. In this state, advertisement-presentation and invoice buckets are generated as well, but the state differs from the fully-filled-content-item state as the chronicle summarizer 432 continues to generate scores for new advertisement chronicles and determine whether further placements are to be assigned.

Example 9

A general-contractor firm uses chronicle engine 115. A partner of the firm customizes the chronicle engine 115. He indicates that a chronicle is to be associated with each project.

He identifies chronicle requirements, which vary depending on a type of project. For a house construction project, he indicates that the chronicle must include a name, phone number and address of a client, a location of the project, an estimated cost range of the project, a number of bedrooms, a number of bathrooms, an estimated project-completion date and names and phone numbers of special contractors. The chronicle is also to include content objects for blueprints, building permits, electrical permits and a liability disclaimer.

He indicates types of agents that are responsible for collecting the required information and the types of agents that are responsible for entering the required information into the forms, for collecting the non-form content objects and for reviewing and approving the form and non-form content objects. He identifies chronicle states as: client intake and plan objectives, blueprint design and special-contractor outreach. He indicates that a chronicle is to advance from the client intake and plan objectives state to the blueprint design state once the required information has been gathered and the client has signed a contract with firm; and that a chronicle is to advance from the blueprint design state to the special-contractor outreach state once blueprints have been generated by an architect and approved by a supervisor internal agent.

A chronicle is then generated as each project request is received. A first bucket is generated and includes a first form which includes fields for a requesting entity (e.g., name, phone number, etc.). A second bucket is generated and includes a second form which includes fields for plan objectives (e.g., number of bedrooms, location, cost constraints, number of bathrooms, number of floors, exterior material, roof material, quality of kitchen appliances, types of cabinets, types of floors, etc.). An internal agent meets with a requestor and fills out some of the fields in the first and second fields, skipping fields when the requesting entity did not have a preference or did not know the pertinent information. The chronicle summarizer determines when the first and second forms have been sufficiently completed.

An alert is then generated and sent to a supervisor internal agent, with the alert identifying the chronicle. The supervisor internal agent logs into the chronicle engine 115 and determines whether he will agree to take on the project. He indicates his decision and rationale in a third bucket that includes a third form with fields for the decision, an optional cost and date-completion estimate and rationale. The third form further includes a service contract, setting further plan objectives and the estimated cost and date-completion. Upon identifying the acceptance, an alert is then sent to the internal agent, who presents the contract to the requesting entity and determines whether the requesting entity. The entity can then itself electronically sign the contract or request that the internal agent sign it on its behalf. The state-advancement engine then advances the chronicle to the blueprint state.

If the supervisor internal agent does not accept the project, the project is stalled and the chronicle remains in its current state unless the supervisor changes his mind (e.g., upon getting another alert after field values are changed in the first and/or second forms). If the requesting entity does not sign the contract, the project is similarly stalled, and the chronicle remains in its current state unless the requesting entity signs the contract (e.g., upon getting a revised estimate from the supervisor internal agent.

If the chronicle's state is advanced to the blueprint state, an alert of the state change is generated and sent to an architect agent. The architect agent logs into the chronicle engine 115. He can view the second bucket but not the first bucket. The architect generates and uploads blueprints. When the architect attempts to save the blueprints, he is asked to confirm that they are blueprints. The blueprints are then placed in a third bucket and named according to a naming convention (e.g., "Blueprints"). Upon the filling of the third bucket, an alert is generated and sent to the internal agent and the supervisor internal agent. The internal agent reviews the blueprints with the requesting entity and the supervisor internal agent reviews it himself. The agents can each modify the blueprints object to add comments and to indicate a final acceptance or refusal of the plans. The plans are first rejected by the internal agent (on behalf of the requesting entity), and an alert is generated and sent to the architect. The architect revises the plans and uploads revised blueprints. When the architect attempts to save the revised blueprints, he is asked to confirm that they are revised blueprints. The revised blueprints are then placed in a fourth bucket and named according to a naming convention (e.g., "RevisedBlueprints1"). Upon the filling of the fourth bucket, an alert is generated and sent to the internal agent and the supervisor internal agent. The internal agent reviews the blueprints with the requesting entity and the supervisor internal agent reviews it himself. At this point, both agents approve the blueprints. Chronicle summarizer 432 notes the approval, and the state-advancement engine 440 advances the chronicle's state to the special-contractor outreach state.

A fifth bucket is generated and includes a spreadsheet form. The supervisor internal agent accesses the spreadsheet form and identifies a set of contractor types and tasks that are to be performed by each contractor type. The supervisor internal agent then changes a status of the spreadsheet form from incomplete to complete. The chronicle summarizer 432 detects this status change and then sends alerts to each special contractor on a predefined list. The alert includes a response deadline. Each special contractor logs into the chronicle engine and can view the approved blueprint (i.e., the fourth) bucket and the fifth bucket. Each special contractor can also view a respective sixth bucket which includes a form with fields for a cost estimate, a completion-time estimate and comments. Each special contractor accesses the respective bucket and completes the fields. Upon arrival of the response deadline, a seventh bucket is generated which includes a second spreadsheet form with data from each sixth bucket. An alert of the deadline is generated and sent to the supervisor internal agent. He logs in and modifies the second spreadsheet form to indicate which special contractors have been selected. He changes a status of the second spreadsheet form from incomplete to complete, and alerts are sent to each special contractor indicating whether they were selected. Selected special contractors can continue to access the chronicle, while unselected special contractors cannot.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Specific examples have been provided herein to illustrate potential applications and uses. It will be understood that parts of examples can be modified. For example, a type of customization described with respect to one industry can also be applied for another industry.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for dynamically monitoring processing of requests for financial services, the system comprising:
one or more processors;
a file request detector that detects a request from a user for the dynamic service file;
a parameter detector that identifies a parameter of interest that characterizes a status or outcome of processing requests for a financial service;
an agent authorizer that identifies a level of access to be granted to the user;
a summarization level adapter that:
receives, from the user, a first input that identifies a first summarization level along an aggregation hierarchy, wherein the first summarization level influences which chronicles are to be collectively analyzed, wherein the first summarization level along the aggregation hierarchy specifies which chronicles are to be aggregated to determine a first summarization variable; and
receiving, from the user, a second input corresponding to an identification of a second summarization level;
an inter-chronicle summarizer that:
identifies a set of chronicles, wherein the level of access indicates that the user is authorized to review outputs characterizing the parameter of interest associated with each chronicle in the set of chronicles, and wherein each chronicle in the set of chronicles corresponds to an electronic file that includes data collected during a process for evaluating a request for the financial service;
selects a first subset of chronicles from the set of chronicles based on the first summarization level;
identifies a first set of values of the parameter of interest, wherein each value in the first set of values is extracted from a chronicle in the first subset of chronicles;
determines the first summarization variable based on the first set of values of the parameter of interest;
selecting a second subset of chronicles from the set of chronicles based on the second summarization level;
identifies a second set of values of the parameter of interest, wherein each value in the second set of values is extracted from a chronicle in the second subset of chronicles; and
determines a second summarization variable based on the second set of values of the parameter of interest; and
a service-file generator that:
generates a dynamic service file, the generated dynamic service file including the determined first summarization variable;
causes a presentation of the dynamic service file, the second input being received during the presentation of the dynamic service file, wherein the second summarization variable is determined in response to receiving the second input; and
causes adjustment of the dynamic service file in real-time to include the determined second summarization variable.

2. The system for dynamically monitoring processing of requests for financial services as recited in claim 1, wherein the inter-chronicle summarizer further:
separates the set of chronicles into a plurality of first subsets, the plurality of first subsets including the first subset;
for each first subset in the plurality of first subsets:
identifies a first set of values of the parameter of interest, wherein each value in the first set of values is extracted from a chronicle in the first subset of chronicles; and
determines a first summarization variable based on the first set of values of the parameter of interest, wherein the generated dynamic service file includes the first summarization variable;
separates the set of chronicles into a plurality of second subsets, the plurality of second subsets including the second subset; and
for each second subset in the plurality of second subsets:
identifies a second set of values of the parameter of interest, wherein each value in the second set of values is extracted from a chronicle in the second subset of chronicles; and
determines a second summarization variable based on the second set of values of the parameter of interest, wherein the adjusted dynamic service file includes the second summarization variable.

3. The system for dynamically monitoring processing of requests for financial services as recited in claim 2, wherein:
each first subset in the plurality of first subsets of chronicles is associated with a different entity of a first entity type in a financial institution,
each second subset in the plurality of second subsets of chronicles is associated with a different entity of a second entity type in the financial institution, and
the first entity type and second entity type are different.

4. The system for dynamically monitoring processing of requests for financial services as recited in claim 1, wherein the parameter of interest is identified based on a third input received from the user.

5. The system for dynamically monitoring processing of requests for financial services as recited in claim 1, wherein the first summarization variable includes a count or percentage of requests.

6. The system for dynamically monitoring processing of requests for financial services as recited in claim 1, wherein each chronicle in the set of chronicles corresponds to a request for a loan.

7. The system for dynamically monitoring processing of requests for financial services as recited in claim 1, the system further comprising a per-chronicle analyzer that identifies an outlier chronicle from the first subset of chronicles based on the first set of values, wherein the generated dynamic service file includes an identification of the outlier chronicle.

8. The system for dynamically monitoring processing of requests for financial services as recited in claim 1, wherein the agent authorizer further:
identifies a type of information that is prohibited for presentation to the user; and
causes the dynamic service file to be generated and adjusted in a manner such that the dynamic service file does not include information of the identified type.

9. A method for dynamically monitoring processing of requests for financial services, the method comprising:
identifying, using one or more processors, a parameter of interest that characterizes a status or outcome of processing requests for a financial service;
detecting a request from a user for a dynamic service file;
receiving, from the user, a first input that identifies a first summarization level along an aggregation hierarchy, wherein the first summarization level influences which chronicles are to be collectively analyzed, wherein the first summarization level along the aggregation hierarchy specifies which chronicles are to be aggregated to determine a first summarization variable;

identifying a level of access to be granted to the user;

identifying a set of chronicles, wherein the level of access indicates that the user is authorized to review outputs characterizing the parameter of interest associated with each chronicle in the set of chronicles, and wherein each chronicle in the set of chronicles corresponds to an electronic file that includes data collected during a process for evaluating a request for the financial service;

selecting a first subset of chronicles from the set of chronicles based on the first summarization level;

identifying a first set of values of the parameter of interest, wherein each value in the first set of values is extracted from a chronicle in the first subset of chronicles;

determining the first summarization variable based on the first set of values of the parameter of interest;

generating a dynamic service file, the generated dynamic service file including the determined first summarization variable;

causing a presentation of the dynamic service file;

receiving, during the presentation of the dynamic service file, a second input corresponding to an identification of a second summarization level along the aggregation hierarchy;

in response to receiving the second input, selecting a second subset of chronicles from the set of chronicles based on the second summarization level, wherein the second subset is a subset of the first subset;

identifying a second set of values of the parameter of interest, wherein each value in the second set of values is extracted from a chronicle in the second subset of chronicles;

determining a second summarization variable based on second set of values of the parameter of interest; and causing adjustment of the dynamic service file in real-time to include the determined second summarization variable.

10. The method for dynamically monitoring processing of requests for financial services as recited in claim 9, the method further comprising:

separating the set of chronicles into a plurality of first subsets, the plurality of first subsets including the first subset;

for each first subset in the plurality of first subsets:
identifying a first set of values of the parameter of interest, wherein each value in the first set of values is extracted from a chronicle in the first subset of chronicles; and
determining a first summarization variable based on the first set of values of the parameter of interest, wherein the generated dynamic service file includes the first summarization variable;

separating the set of chronicles into a plurality of second subsets, the plurality of second subsets including the second subset; and for each second subset in the plurality of second subsets:
identifying a second set of values of the parameter of interest, wherein each value in the second set of values is extracted from a chronicle in the second subset of chronicles; and
determining a second summarization variable based on the second set of values of the parameter of interest, wherein the adjusted dynamic service file includes the second summarization variable.

11. The method for dynamically monitoring processing of requests for financial services as recited in claim 10, wherein:

each first subset in the plurality of first subsets of chronicles is associated with a different entity of a first entity type in a financial institution, each second subset in the plurality of second subsets of chronicles is associated with a different entity of a second entity type in the financial institution, and the first entity type and second entity type are different.

12. The method for dynamically monitoring processing of requests for financial services as recited in claim 9, wherein the parameter of interest is identified based on a third input received from the user.

13. The method for dynamically monitoring processing of requests for financial services as recited in claim 9, wherein the first summarization variable includes a count or percentage of requests.

14. The method for dynamically monitoring processing of requests for financial services as recited in claim 9, wherein each chronicle in the set of chronicles corresponds to a request for a loan.

15. The method for dynamically monitoring processing of requests or financial services as recited in claim 9, further comprising identifying an outlier chronicle from the first subset of chronicles based on the first set of values, wherein the generated dynamic service file includes an identification of the outlier chronicle.

16. The method for dynamically monitoring processing of requests for financial services as recited in claim 9, the method further comprising:

identifying a type of information that is prohibited for presentation to the user; and causing the dynamic service file to be generated and adjusted in a manner such that the dynamic service file does not include information of the identified type.

17. A non-transitory computer-readable medium having sets of instructions stored thereon which, when executed by a computer, cause the computer to:

identify a parameter of interest that characterizes a status or outcome of processing requests for a financial service;

detect a request from a user for a dynamic service file;

receive, from the user, a first input that identifies a first summarization level along an aggregation hierarchy, wherein the first summarization level influences which chronicles are to be collectively analyzed, wherein the first summarization level along the aggregation hierarchy specifies which chronicles are to be aggregated to determine a first summarization variable;

identify a level of access to be granted to the user;

identify a set of chronicles, wherein the level of access indicates that the user is authorized to review outputs characterizing the parameter of interest associated with each chronicle in the set of chronicles, and wherein each chronicle in the set of chronicles corresponds to an electronic file that includes data collected during a process for evaluating a request for the financial service;

select a first subset of chronicles from the set of chronicles based on the first summarization level;

identify a first set of values of the parameter of interest, wherein each value in the first set of values is extracted from a chronicle in the first subset of chronicles;

determine the first summarization variable based on the first set of values of the parameter of interest;

generate a dynamic service file, the generated dynamic service file including the determined first summarization variable;

cause a presentation of the dynamic service file;

receive, during the presentation of the dynamic service file, a second input corresponding to an identification of a second summarization level along the aggregation hierarchy;

in response to receiving the second input, select a second subset of chronicles from the set of chronicles based on the second summarization level, wherein the second subset is a subset of the first subset;

identify a second set of values of the parameter of interest, wherein each value in the second set of values is extracted from a chronicle in the second subset of chronicles;

determine a second summarization variable based on the second set of values of the parameter of interest; and cause adjustment of the dynamic service file in real-time to include the determined second summarization variable.

18. The non-transitory computer-readable medium having sets of instructions stored thereon as recited in claim 17, wherein the sets of instructions, when executed by the computer, further cause the computer to:

separate the set of chronicles into a plurality of first subsets, the plurality of first subsets including the first subset;

for each first subset in the plurality of first subsets:
identify a first set of values of the parameter of interest, wherein each value in the first set of values is extracted from a chronicle in the first subset of chronicles; and determine a first summarization variable based on the first set of values of the parameter of interest, wherein the generated dynamic service file includes the first summarization variable;

separate the set of chronicles into a plurality of second subsets, the plurality of second subsets including the second subset; and for each second subset in the plurality of second subsets:
identify a second set of values of the parameter of interest, wherein each value in the second set of values is extracted from a chronicle in the second subset of chronicles; and determine a second summarization variable based on the second set of values of the parameter of interest, wherein the adjusted dynamic service file includes the second summarization variable wherein:
each first subset in the plurality of first subsets of chronicles is associated with a different entity of a first entity type in a financial institution, each second subset in the plurality of second subsets of chronicles is associated with a different entity of a second entity type in the financial institution, and the first entity type and second entity type are different.

19. The non-transitory computer-readable medium having sets of instructions stored thereon as recited in claim 17, wherein the sets of instructions, when executed by the computer, further cause the computer to:

identify a type of information that is prohibited for presentation to the user; and cause the dynamic service file to be generated and adjusted in a manner such that the dynamic service file does not include information of the identified type.

20. The non-transitory computer-readable medium having sets of instructions stored thereon as recited in claim 17, wherein each chronicle in the set of chronicles corresponds to a request for a loan.

\* \* \* \* \*